United States Patent
Yuasa et al.

(10) Patent No.: US 9,985,256 B2
(45) Date of Patent: May 29, 2018

(54) ENERGY STORAGE APPARATUS, METHOD FOR MANUFACTURING THE SAME AND METHOD FOR MANUFACTURING ADJACENT MEMBER FOR ENERGY STORAGE APPARATUS

(71) Applicants: GS Yuasa International Ltd., Kyoto-shi (JP); Honda Motor Co., Ltd., Tokyo (JP)

(72) Inventors: Eiji Yuasa, Kyoto (JP); Kentaro Shibuya, Wako (JP)

(73) Assignees: GS YUASA INTERNATIONAL LTD., Kyoto-Shi, Kyoto (JP); HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/436,410

(22) Filed: Feb. 17, 2017

(65) Prior Publication Data

US 2017/0244077 A1    Aug. 24, 2017

(30) Foreign Application Priority Data

Feb. 19, 2016   (JP) ................. 2016-030352

(51) Int. Cl.
*H01M 10/052*   (2010.01)
*H01M 2/10*     (2006.01)
*H01G 11/10*    (2013.01)

(52) U.S. Cl.
CPC .......... *H01M 2/1016* (2013.01); *H01G 11/10* (2013.01)

(58) Field of Classification Search
CPC ....................... H01M 10/052; H01M 2/1016
See application file for complete search history.

(56) References Cited

U.S. PATENT DOCUMENTS 7,625,665 B2   12/2009 Jeon et al.
2013/0330587 A1   12/2013 Takahashi et al.

FOREIGN PATENT DOCUMENTS

| JP | 2006-156392 A | 6/2006 |
| JP | 2014-044884 A | 3/2014 |
| WO | WO 2012/066875 A1 | 5/2012 |

*Primary Examiner* — Olatunji Godo
(74) *Attorney, Agent, or Firm* — McGinn IP Law Group, PLLC

(57) ABSTRACT

Provided is an energy storage apparatus including an energy storage device, an opposedly facing member which opposedly faces the energy storage device in a first direction, and an adjacent member which includes a body portion disposed adjacently to the energy storage device in a second direction orthogonal to the first direction, and containing a connection portion partially connected to the opposedly facing member at an end portion of the body portion in the first direction. The body portion of the adjacent member contains a cavity portion which opens at an end portion of the body portion in a direction orthogonal to the second direction and extends in the direction orthogonal to the second direction.

9 Claims, 20 Drawing Sheets

ENERGY STORAGE APPARATUS, METHOD FOR MANUFACTURING THE SAME AND METHOD FOR MANUFACTURING ADJACENT MEMBER FOR ENERGY STORAGE APPARATUS

CROSS-REFERENCE TO RELATED APPLICATIONS

This application is based on Japanese Patent Application No. 2016-030352 filed on Feb. 19, 2016, the entire contents of which is hereby incorporated by reference.

FIELD

The present invention relates to an energy storage apparatus which includes energy storage devices and adjacent members which position the energy storage devices, a method for manufacturing the energy storage apparatus, and a method for manufacturing an adjacent member for the energy storage apparatus.

BACKGROUND

Conventionally, as a battery system which includes a plurality of flat secondary batteries, there has been provided a battery system which is manufactured by taking into account vibration resistance and impact resistance (see JP 2014-44884 A, for example). Such a battery system includes: a battery assembly formed by stacking a plurality of flat secondary batteries in a thickness direction; a pair of end plates disposed on both end surfaces of the battery assembly in a stacking direction; bind bars connected to the pair of end plates and fixing the flat secondary batteries in the stacking direction by applying pressure to the flat secondary batteries; and an intermediate reinforcing plate disposed between the flat secondary batteries which form the battery assembly and fixed to the bind bars.

In such a battery system, the end plates and the intermediate reinforcing plate fix the stacked flat secondary batteries in a pressurized state. That is, in the battery system, the battery assembly (flat secondary batteries) is fixed in a state where the battery assembly is positioned with reference to the intermediate reinforcing plate.

Such a battery system is mounted on an automobile or the like as a power source and hence, there has been a demand for reduction of a weight of the battery system. However, the battery system having the above-mentioned configuration includes the intermediate reinforcing plate and hence, the battery system has a large weight because of the presence of the intermediate reinforcing plate.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus where an energy storage device can be appropriately positioned while the increase of a weight of the energy storage apparatus is suppressed, a method for manufacturing the energy storage apparatus, and a method for manufacturing an adjacent member for the energy storage apparatus.

An energy storage apparatus according to an aspect of the present invention includes:

an energy storage device;

an opposedly facing member which opposedly faces the energy storage device in a first direction; and an adjacent member which includes a body portion disposed adjacently to the energy storage device in a second direction orthogonal to the first direction, and containing a connection portion connected to the opposedly facing member at an end portion of the body portion in the first direction, wherein the body portion of the adjacent member contains a cavity portion which opens at an end portion of the body portion in a direction orthogonal to the second direction and extends in the direction orthogonal to the second direction.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
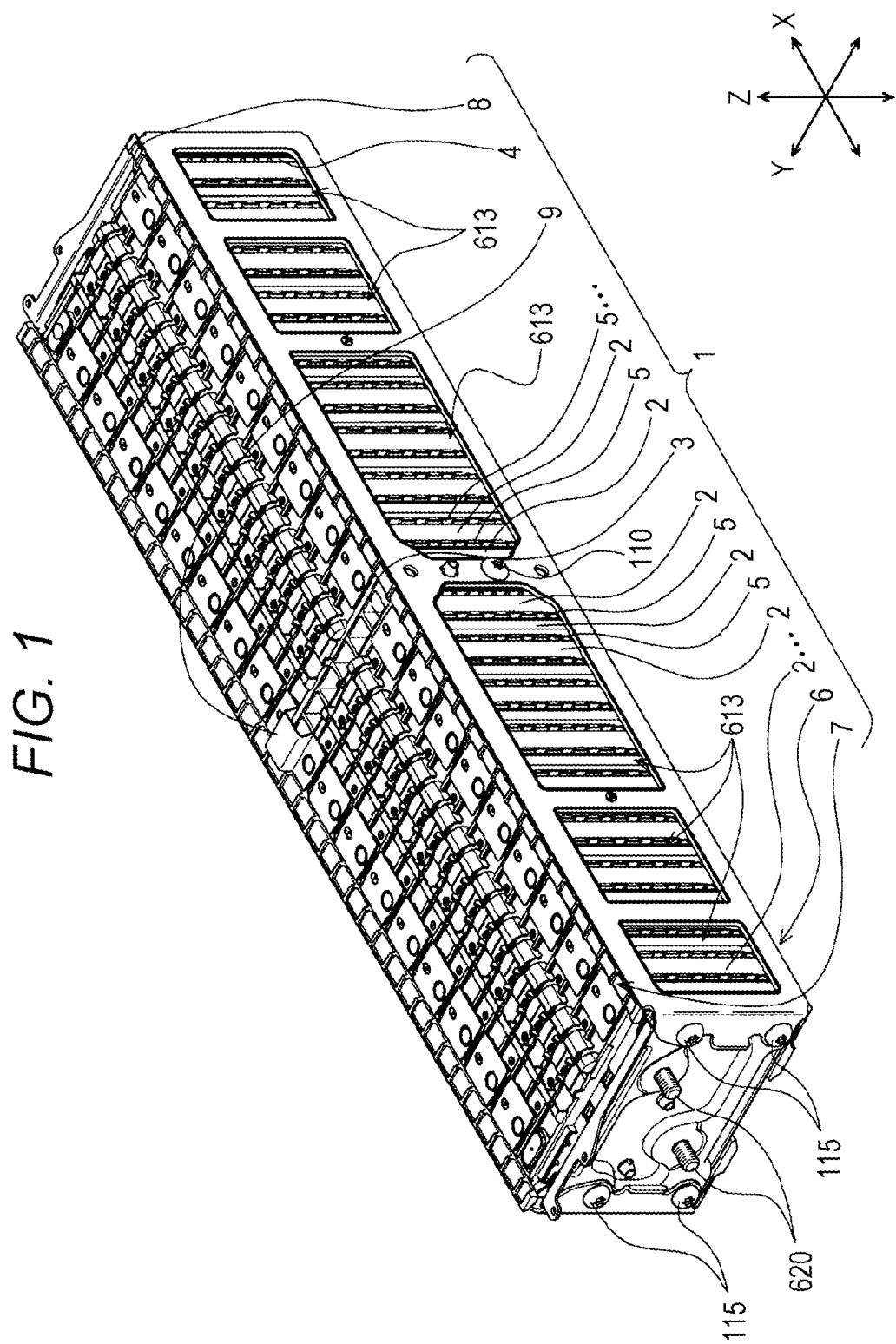
FIG. 1 is an entire perspective view of an energy storage apparatus according to an embodiment.

According to an aspect of the present invention, there is provided an energy storage apparatus including
an energy storage device;
an opposedly facing member which opposedly faces the energy storage device in a first direction; and
an adjacent member which includes a body portion disposed adjacently to the energy storage device in a second direction orthogonal to the first direction, and containing a connection portion connected to the opposedly facing member at an end portion of the body portion in the first direction, wherein
the body portion of the adjacent member contains a cavity portion which opens at an end portion of the body portion in a direction orthogonal to the second direction and extends in the direction orthogonal to the second direction.

With such a configuration, the energy storage device is disposed adjacently to the body portion of the adjacent member connected to the opposedly facing member and hence, the energy storage device is positioned with reference to the adjacent member. The body portion of the adjacent member has the cavity portion which opens at the end portion of the body portion in the direction orthogonal to the second direction and extends in the direction orthogonal to the second direction and hence, an occupation ratio of a space over the whole adjacent member is increased. Accordingly, the increase of a weight of the adjacent member can be suppressed. As a result, the increase of a weight of the whole energy storage apparatus can be suppressed.

The body portion may contain the cavity portion which includes a plurality of cavity portions, and
the plurality of cavity portions may be disposed parallel to each other.

With such a configuration, the plurality of cavity portions increase an occupation ratio of a space in the inside of the adjacent member. Further, by disposing the plurality of independent cavity portions parallel to each other, a solid portion (rib-like portion) exists between the cavity portions disposed adjacently to each other and hence, rigidity (rigidity capable of resisting against a force which sandwiches the energy storage device) in the second direction of the adjacently member (body portion) is acquired with certainty.

The energy storage apparatus having the above-mentioned configuration may include a passage through which a fluid is made to flow between the body portion and the energy storage device disposed adjacently to the body portion, and
the cavity portion may include a non-through hole which extends in a direction which corresponds to a flow direction of the fluid in the passage.

With such a configuration, it is possible to prevent the fluid from passing through the inside of the body portion of the adjacent member via the cavity portion and hence, a fluid can be supplied to the passage formed along the energy storage device without loss.

The cavity portion may include,
a first cavity portion which opens at an end portion of the body portion in a third direction orthogonal to the first direction and the second direction, and extends in the third direction, and
a second cavity portion which opens at an end portion of the body portion in the first direction at a position displaced from the connection portion in the third direction, and extends in the first direction.

With such a configuration, in addition to the first cavity portion, the second cavity portion extending in the first direction can be formed in the region where the first cavity portion extending in the third direction cannot be formed due to the presence of the connection portion. With such a configuration, an occupation ratio of a space in the whole adjacent member can be increased. Accordingly, the increase of a weight of the adjacent member can be suppressed. As a result, the increase of a weight of the whole energy storage apparatus can be suppressed.

The opposedly facing member may be disposed on both sides of the energy storage device in the first direction, and
the body portion may include
the connection portion at both end portions of the body portion in the first direction,
the second cavity portion which opens at one end portion of the body portion in the first direction, and
the second cavity portion which opens at the other end portion of the body portion in the first direction.

With such a configuration, the connection portions formed on both end portions of the adjacent member in the first direction are respectively connected to the corresponding opposedly facing members and hence, the adjacent member can be firmly fixed. Accordingly, the adjacent member can position the energy storage device with certainty.

The body portion of the adjacent member has the second cavity portion which opens at one end portion of the body portion in the first direction, and the second cavity portion which opens at the other end portion of the body portion in the first direction. Accordingly, even when the connection portion is disposed on both end portions of the adjacent member in the first direction, an occupation ratio of a space can be increased. That is, the second cavity portion extending in the first direction is formed on each of both end portions of the body portion in the first direction where the first cavity portion extending in the third direction cannot be formed due to the presence of the connection portion and hence, an occupation ratio of a space in the whole adjacent member can be further increased.

The first cavity portion may include a through hole,
the second cavity portion may include a non-though hole, and
the first cavity portion and the second cavity portion may be in a non-communication state.

With such a configuration, solid rib-like portions are formed on both sides of the first cavity portion in the first direction and both sides of the second cavity portion in the third direction. Accordingly, strength (compression strength) of the adjacent member in the first direction can be acquired with certainty.

According to another aspect of the present invention, there is provided a method for manufacturing an energy storage apparatus including:
providing an adjacent member which includes a body portion containing a connection portion at least at either one of both end portions of the body portion in a first direction and having a thickness in a second direction orthogonal to the first direction, wherein the body portion contains a cavity portion which opens at an end portion of the body portion in a direction orthogonal to the second direction and extends in a direction orthogonal to the second direction;

connecting the connection portion of the adjacent member to an opposedly facing member extending in the second direction at a middle position in the second direction;

disposing at least one energy storage device in at least either one of two regions disposed in the second direction with the body portion of the adjacent member used as a boundary between the regions; and disposing the energy storage device along the body portion of the adjacent member.

With such a method, the connection portions of the body portion of the adjacent member are connected to the opposedly facing members and hence, the adjacent member is fixed at the predetermined position with respect to the opposedly facing members. Further, the energy storage device is disposed along the adjacent member in a state where the energy storage device is disposed in at least either one of two regions with the body portion of the adjacent member used as a boundary between the regions so that the energy storage device is disposed with reference to the adjacent member. Accordingly, the energy storage device is positioned by being disposed along the body portion of the adjacent member fixed to the opposedly facing member. The body portion of the adjacent member has the cavity portion which opens at the end portion of the body portion in the direction orthogonal to the second direction and extends in the direction orthogonal to the second direction and hence, an occupation ratio of a space over the whole adjacent member is increased. Accordingly, the increase of a weight of the adjacent member can be suppressed. As a result, the increase of a weight of the whole energy storage apparatus can be suppressed.

In this case, the method may further include maintaining the posture of the adjacent member in at least either one of the posture where the adjacent member is connected to the opposedly facing member or the posture where the energy storage device is disposed along the body portion by inserting a jig into the cavity portion of the adjacent member and maintaining the jig at a predetermined position. With such a method, the jig or the like does not exist around the body portion in the first direction and the second direction respectively and hence, it is possible to smoothly perform an operation of connecting the adjacent member and the opposedly facing member to each other and an operation of disposing the energy storage device along the body portion of the adjacent member.

According to still another aspect of the present invention, there is provided a method for manufacturing an adjacent member for an energy storage apparatus, the method including forming an adjacent member by injecting a resin into a molding space formed by fastening a plurality of dies. The adjacent member contains a body portion including a connection portion which is connected to an opposedly facing member disposed adjacently to the adjacent member in a first direction at least at either one of both end portions of the body portion in the first direction, having a thickness in a second direction orthogonal to the first direction, and disposed adjacently to the energy storage device in the second direction. The body portion contains a first cavity portion which opens at least at either one of both end portions of the body portion in a third direction orthogonal to the first direction and the second direction respectively, and extends in the third direction, and a second cavity portion which opens at least at either one of both end portions of the body portion in the first direction at a position displaced from the connection portion in the third direction, and extends in the first direction.

With such a method, it is possible to form, by resin molding, the adjacent member having the body portion which has the connection portion connected to the opposedly facing member at the end portion of the body portion in the first direction and to which the energy storage device is disposed adjacently in the second direction. Further, the body portion of the adjacent member has: the first cavity portion which opens at least at either one of both end portions of the body portion in the third direction orthogonal to the first direction and the second direction respectively, and extends in the third direction; and the second cavity portion which opens at either one of both end portions of the body portion in the first direction at a position displaced from the connection portion in the third direction, and extends in the first direction. Accordingly, an occupation ratio of a space in the whole adjacent member (body portion) is increased. Accordingly, the increase of a weight of the adjacent member is suppressed. As a result, it is possible to suppress the increase of a weight of the whole energy storage apparatus.

The body portion has the first cavity portion and the second cavity portion and hence, in the body portion, an amount of thick wall portion is decreased so that, as a result, shrinkage of a thickness after molding can be suppressed. Accordingly, molding accuracy of the adjacent member can be increased.

With such a configuration, according to the present invention, it is possible to appropriately position the energy storage device while the increase of a weight of the energy storage apparatus is suppressed.

Hereinafter, one embodiment of an energy storage apparatus according to the present invention is described with reference to drawings. Names of respective constitutional members (respective constitutional elements) used in this embodiment are exclusively for this embodiment, and may differ from names of respective constitutional members (respective constitutional elements) used in BACKGROUND.

Figure 2:
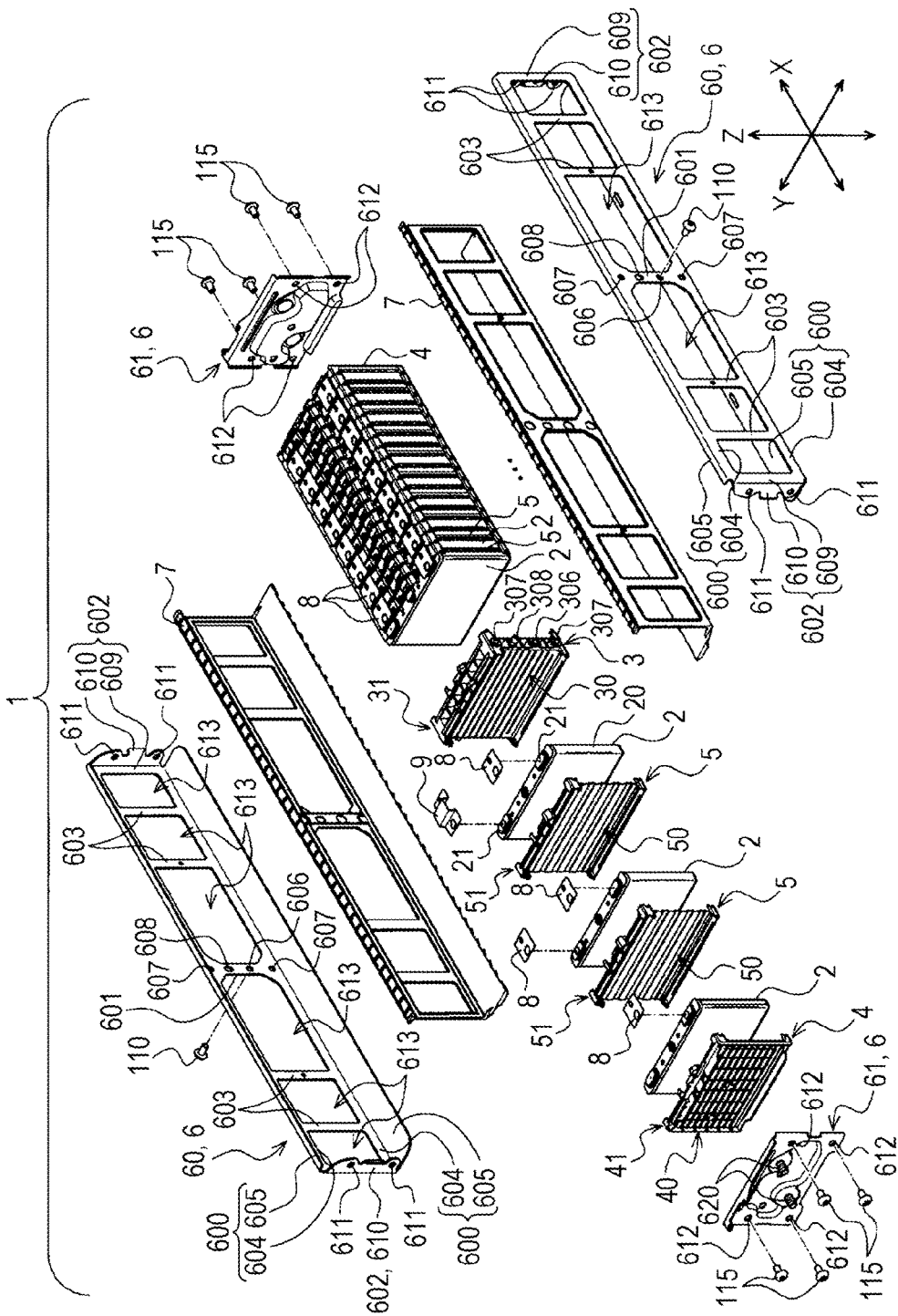
FIG. 2 is an exploded perspective view of the energy storage apparatus.

As shown in FIG. 1 and FIG. 2, the energy storage apparatus includes: energy storage devices 2; adjacent members 3, 4, 5 disposed adjacently to the energy storage devices 2; and a holder 6 collectively holds the energy storage devices 2 and the adjacent members 3, 4, 5. The holder 6 is made of a conductive material. Accordingly, the energy storage apparatus 1 according to this embodiment includes insulators 7 which are disposed between the energy storage devices 2 and the holder 6.

The energy storage apparatus 1 includes a plurality of energy storage devices 2. Accordingly, the energy storage apparatus 1 includes bus bars 8, 9 which electrically connect the energy storage devices 2 to each other.

In the description made hereinafter, for the sake of convenience, the direction along which the energy storage devices 2 and the adjacent members 3, 4, 5 are arranged in a row is assumed as the X axis direction. One of two axial directions orthogonal to the X axis direction is assumed as the Y axis direction, and the other of two axial directions orthogonal to the X axis direction (the direction orthogonal to the X axis direction and the Y axis direction) is assumed as the Z axis direction. Accordingly, in the respective drawings, orthogonal coordinate axes which respectively correspond to the X axis direction, the Y axis direction and the Z axis direction are illustrated.

Figure 3:
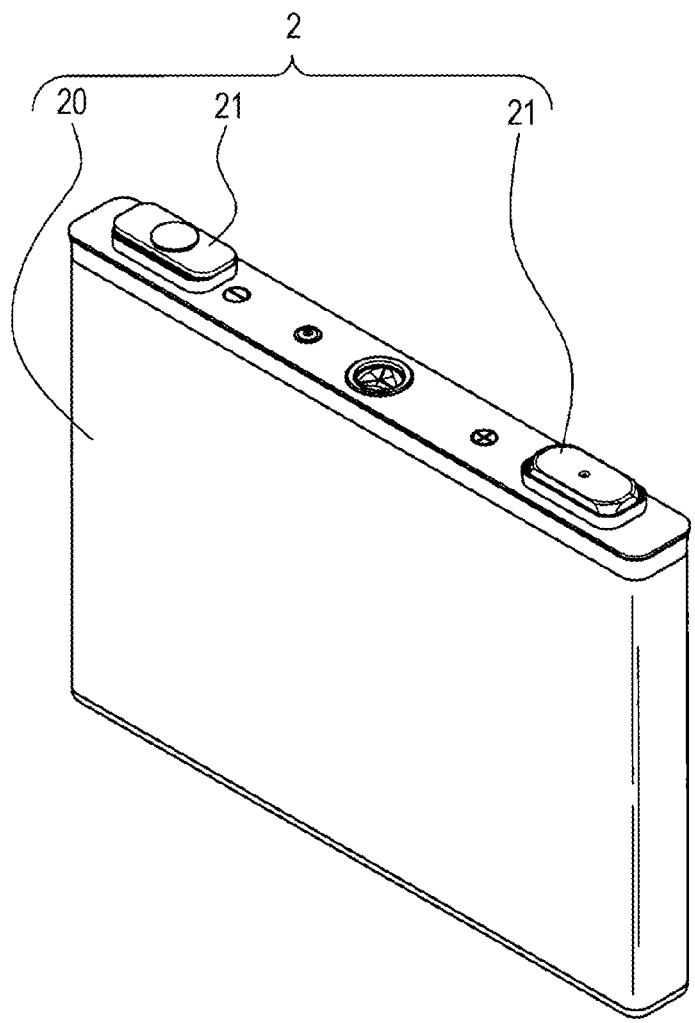
FIG. 3 is an entire perspective view of an energy storage device used in the energy storage apparatus.

As shown in FIG. 2 and FIG. 3, the energy storage device 2 includes: a case 20 in which an electrode assembly having a positive electrode and a negative electrode is housed; and a pair of external terminals 21 disposed on an outer surface of the case 20.

The case 20 is formed into a rectangular parallelepiped shape. An outer size of the case 20 in the X axis direction is smaller than an outer size of the case 20 in the Y axis direction. That is, the case 20 has a flat rectangular parallelepiped shape.

The pair of external terminals 21 is disposed on one of both end surfaces of the case 20 in the Z axis direction. The pair of external terminals 21 is disposed in a spaced-apart manner in the Y axis direction. One of the pair of external terminals 21 is electrically connected to the positive electrode of the electrode assembly housed in the case 20. Meanwhile, the other of the pair of external terminals 21 is electrically connected to the negative electrode of the electrode assembly housed in the case 20.

The adjacent members 3, 4, 5 have insulating property. As shown in FIG. 2, each adjacent member 3, 4, 5 includes a body portion 30, 40, 50 disposed adjacently to the cases 20 of the energy storage devices 2, and restricting portions 31, 41, 51 which prevent positional displacement of the energy storage devices 2 disposed adjacently to the body portion 30, 40, 50.

The adjacent members 3, 4, 5 are described more specifically. As described above, the energy storage apparatus 1 includes the plurality of energy storage devices 2. Along with such a configuration, the energy storage apparatus 1 includes three kinds of adjacent members 3, 4, 5. That is, as the adjacent members, the energy storage apparatus 1 includes: the first adjacent member 3 disposed adjacently to the energy storage devices 2 disposed at an intermediate position in the X axis direction; the second adjacent members 4 each of which is disposed adjacently to the energy storage device 2 disposed at an outermost end of a unit formed of the plurality of energy storage devices 2; and the third adjacent members 5 which are disposed adjacently to the energy storage devices 2 disposed between the first adjacent member 3 and the second adjacent member 4.

Figure 4:
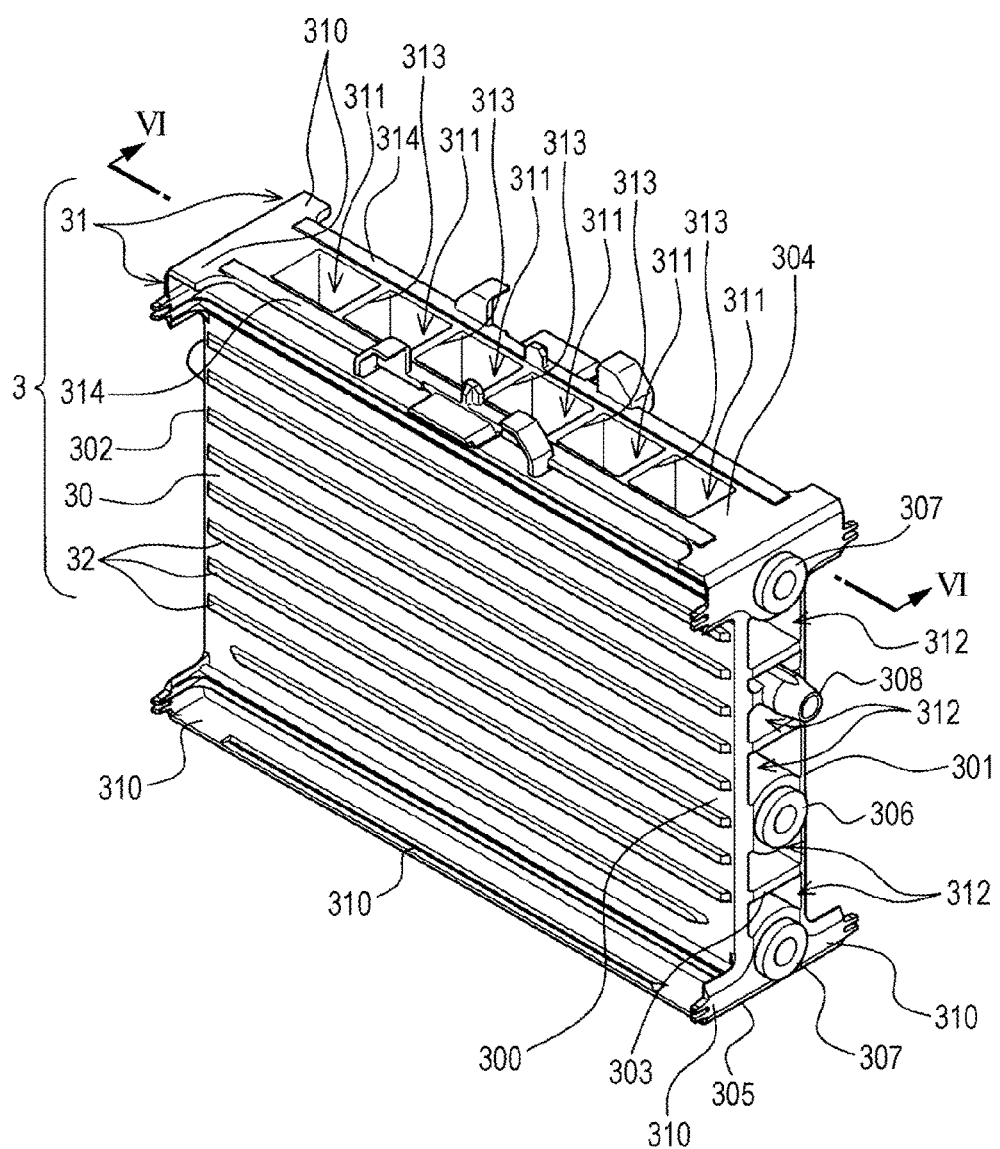
FIG. 4 is an entire perspective view of a first adjacent member used in the energy storage apparatus as viewed from a first surface side.
Figure 4:
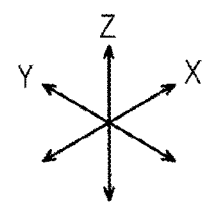
Figure 5:
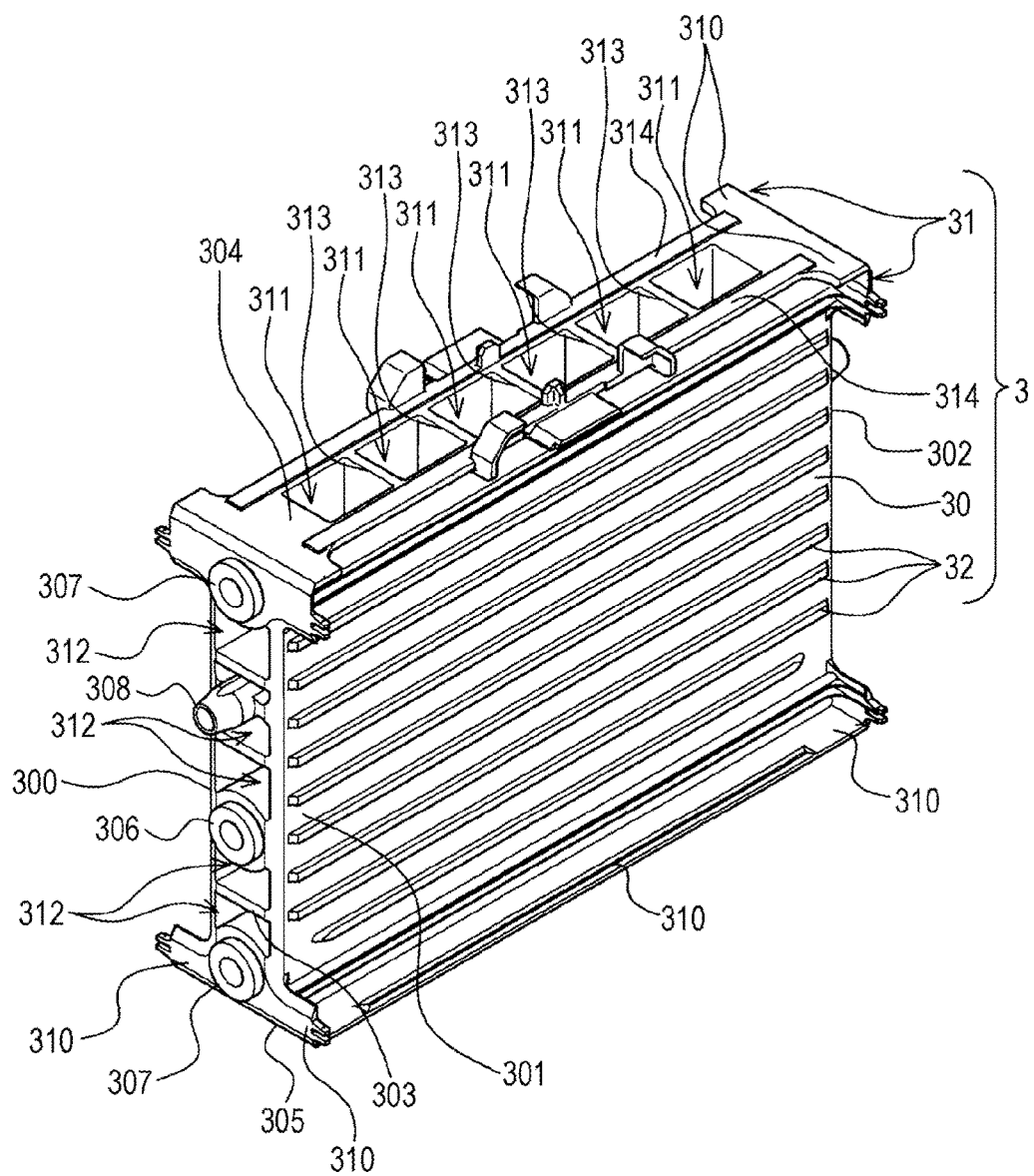
FIG. 5 is an entire perspective view of the first adjacent member used in the energy storage apparatus as viewed from a second surface side.
Figure 5:
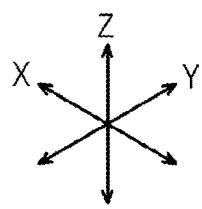

As shown in FIG. 4 and FIG. 5, the first adjacent member 3 has a body portion (hereinafter referred to as "first body portion") 30 disposed adjacently to the energy storage device 2 disposed at the intermediate position in the X axis direction. That is, the first adjacent member 3 has the first body portion 30 disposed between two energy storage devices 2 disposed adjacently to each other at the intermediate position in the X axis direction.

The first adjacent member 3 includes restricting portions (hereinafter referred to as "first restricting portions") 31 which prevent the positional displacement of the energy storage devices 2 disposed adjacently to the first body portion 30. In this embodiment, the first adjacent member 3 includes projecting portions 32 provided for forming flow channels which allow cooling air for cooling the energy storage device 2 to pass through between the first adjacent member 3 and the energy storage device 2 disposed adjacently to the first adjacent member 3.

The first body portion 30 has a first surface 300 and a second surface 301 disposed on a side opposite to the first surface 300 in the X axis direction. The first body portion 30 is formed into a quadrangular shape as viewed in the X axis direction. That is, the first body portion 30 is formed to have substantially the same shape and the same size as an outer surface of the case 20 of the energy storage device 2 which is directed in the X axis direction. The first body portion 30 has a thickness in the X axis direction. Accordingly, the first body portion 30 has a first end portion 302 and a second end portion 303 which is disposed on a side opposite to the first end portion 302 in the Y axis direction. The first body portion 30 also has a third end portion 304 and a fourth end portion 305 which is disposed on a side opposite to the third end portion 304 in the Z axis direction.

Figure 6:
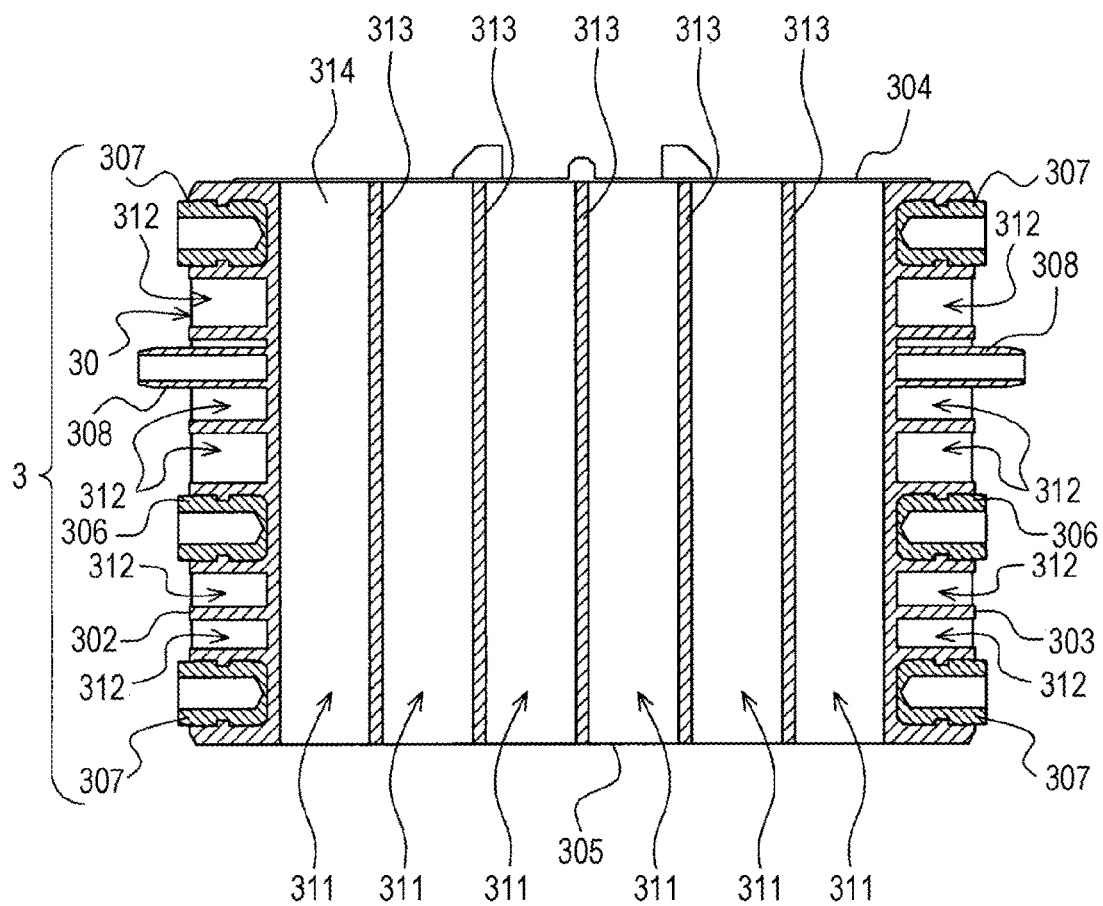
FIG. 6 is a cross-sectional view taken along a line VI-VI in FIG. 4.

The first body portion 30 includes connection portions (hereinafter referred to as "first connection portions") 306 which are connected to the holder 6 (opposedly facing member 60 described later) on the end portions thereof in the Y axis direction. In this embodiment, as shown in FIG. 4 to FIG. 6, the first body portion 30 includes the first connection portion 306 on both end portions thereof in the Y axis direction. That is, the first body portion 30 includes at least a pair of first connection portions 306. The pair of first connection portions 306 is arranged symmetrically with respect to an imaginary line (a center line of the first body portion 30) extending in the Z axis direction.

In this embodiment, the first body portion 30 includes connection portions (hereinafter referred to as "second connection portions") 307 to which air supply ducts (not shown in the drawing) through which cooling air for cooling the energy storage device 2 is supplied are connected. The first body portion 30 includes the second connection portions 307 on both end portions thereof in the Y axis direction. That is, the first body portion 30 includes at least a pair of second connection portions 307. Each of the pair of second connection portions 307 is disposed at a position displaced from the first connection portion 306 in the Z axis direction, and the pair of second connection portions 307 is arranged symmetrically with respect to an imaginary line (the center line of the first body portion 30) extending in the Z axis direction.

In this embodiment, the first connection portions 306 and the second connection portions 307 are parts made of metal. Portions of the first adjacent member 3 other than the first connection portions 306 and the second connection portions 307 are made of a resin.

To be more specific, the first connection portion 306 is a female threaded member made of metal, and is embedded in a resin portion around the first connection portion 306 (a resin portion of the first body portion 30) in a state where a threaded hole 306a (the center of the screw) is directed in the Y axis direction. One first connection portion 306 is disposed on one end portion of the first body portion 30 in the Y axis direction, and slightly projects from the first end portion 302 of the first body portion 30. The other first connection portion 306 is disposed on the other end portion of the first body portion 30 in the Y axis direction, and slightly projects from the second end portion 303 of the first body portion 30. With such a configuration, the pair of first connection portions 306 has threaded holes opening in the opposite directions.

The second connection portion 307 is a female threaded member made of metal, and is embedded in a resin portion around the second connection portion 307 in a state where a threaded hole (the center of the screw) is directed in the Y axis direction. One second connection portion 307 is disposed on one end portion of the first body portion 30 in the Y axis direction, and slightly projects from the first end portion 302 of the first body portion 30. The other second connection portion 307 is disposed on the other end portion of the first body portion 30 in the Y axis direction, and slightly projects from the second end portion 303 of the first body portion 30. With such a configuration, the threaded holes of the pair of second connection portions 307 open in the directions opposite to each other.

In this embodiment, the first adjacent member 3 includes the shaft portions 308 which are engaged with the holders 6 respectively. To be more specific, the first adjacent member 3 includes the shaft portions 308 which project from the end portions of the first body portion 30 in the Y axis direction respectively. In this embodiment, the first adjacent member 3 includes the shaft portions 308 which project from both end portions of the first body portion 30 in the Y axis direction (the first end portion 302 and the second end portion 303) respectively. The pair of shaft portions 308 disposed on both end portions of the first body portion 30 has an axis which extends in the Y axis direction respectively, and the pair of shaft portions 308 is coaxially disposed. The first body portion 30 includes the first connection portion 306 and the second connection portion 307 on each end portion thereof in the Y direction so that each shaft portion 308 is disposed at a position which avoids the first connection portion 306 and the second connection portions 307. In this embodiment, each shaft portion 308 is disposed between the first connection portion 306 and the second connection portion 307.

The first body portion 30 has cavity portions 311, 312 which open at the end portions of the first body portion 30 in the directions orthogonal to the X axis direction, and extend in the directions orthogonal to the X axis direction. In this embodiment, the first body portion 30 has, as the cavity portions 311, 312: the first cavity portions 311 which open at the end portions (third end portion 304, fourth end portion 305) of the first body portion 30 in the Z axis direction and extend in the Z axis direction; and the second cavity portions 312 which open at the end portions (the first end portion 302 and the second end portion 303) of the first body portion 30 in the Y axis direction at positions displaced from the first connection portions 306 in the Z axis direction, and extend in the Y axis direction. The first body portion 30 includes the plurality of first cavity portions 311. The plurality of first cavity portions 311 are arranged parallel to each other. In this embodiment, the plurality of first cavity portions 311 are arranged in a row in the Y axis direction.

The first body portion 30 includes the first connection portions 306 which are formed on both end portions thereof in the Y axis direction so that the first body portion 30 includes: the second cavity portions 312 which open on one end portion of the first body portion 30 in the Y axis direction (first end portion 302); and the second cavity portions 312 which open on the other end portion of the first body portion 30 in the Y axis direction (second end portion 303). The first cavity portions 311 are through holes, while the second cavity portions 312 are non-through holes. The first cavity portions 311 and the second cavity portions 312 are not communicated with each other (see FIG. 6).

To describe the configuration more specifically, in this embodiment, each first cavity portion 311 is formed into a quadrangular shape as viewed in the Z axis direction. The plurality of respective first cavity portions 311 have substantially the same shape as viewed in the Z axis direction. The plurality of first cavity portions 311 are disposed between both end portions of the first body portion 30 in the Y axis direction where the first connection portion 306 is provided respectively. That is, the plurality of first cavity portions 311 are disposed at positions which avoid the end portions of the first body portion 30 in the Y axis direction where the first connection portion 306 is provided respectively.

Meanwhile, the second cavity portions 312 are disposed at positions which avoid the first connection portion 306 in the Z axis direction. In this embodiment, the first body portion 30 includes the second connection portions 307 and the shaft portion 308 on the respective end portions thereof. Accordingly, the second cavity portions 312 are disposed at positions which avoid the first connection portion 306, the second connection portions 307 and the shaft portion 308 on each end portion of the first body portion 30. To be more specific, the first connection portion 306, the second connection portions 307 and the shaft portion 308 are disposed in a spaced-apart manner from each other in the Z axis direction. Accordingly, the second cavity portion 312 is disposed between the first connection portion 306 and the second connection portion 307, between the shaft portion 308 and the second connection portion 307, and between the first connection portion 306 and the shaft portion 308. That is, the first body portion 30 has the plurality of second cavity portions 312 arranged parallel to each other at the first end portion 302 and the second end portion 303 respectively. In this embodiment, the plurality of second cavity portions 312 are arranged in a row in the Z axis direction at the first end portion 302 and the second end portion 303 of the first body portion 30 respectively.

With such a configuration, the first body portion 30 is configured such that a plurality of plate-like ribs 313 each of which expands in the X axis direction as well as in the Z axis direction are formed at intervals in the Y axis direction in a state where each rib 313 is disposed between each two of the first cavity portions 311 which are arranged in a row in the Y axis direction. That is, the first body portion 30 includes: a pair of partition wall portions 314 which face each other in the X axis direction with a distance therebetween; and the ribs 313 which connect the pair of partition wall portions 314 with each other, and the pair of partition wall portions 314 and the ribs 313 form the first cavity portions 311.

The first body portion 30 further includes: solid portions which support the first connection portions 306; solid portions which support the second connection portions 307; and solid portions which support the shaft portions 308. These solid portions are connected to the pair of partition wall portions 314 thus forming the second cavity portions 312 in cooperation with the pair of partition wall portions 314.

As shown in FIG. 4 and FIG. 5, the first restricting portion 31 includes a restricting member 310 extending in the X axis direction along an outer edge of the first body portion 30. To describe the configuration more specifically, the first adjacent member 3 includes the pairs of first restricting portions 31 which restrict two energy storage devices 2 disposed adjacently to the first adjacent member 3 in the X axis direction. The respective restricting members 310 of each pair of first restricting portions 31 extend in the directions opposite to each other in the X axis direction from the first body portion 30. That is, the restricting member 310 of one first restricting portion 31 extends toward the outside in the X axis direction from the first surface 300 of the first body portion 30, while the restricting member 310 of the other first restricting portion 31 extends toward the outside in the X axis direction from the second surface 301 of the first body portion 30.

The respective restricting members 310 of the pair of first restricting portions 31 are disposed along four corners (four corner portions) of at least the first body portion 30 respectively. That is, the respective restricting members 310 of each pair of first restricting portions 31 are respectively disposed along a first corner portion which includes an intersection point between the first end portion 302 and the third end portion 304 of the first body portion 30, a second corner portion which includes an intersection point between the second end portion 303 and the third end portion 304 of the first body portion 30, a third corner portion which includes an intersection point between the first end portion 302 and the fourth end portion 305 of the first body portion 30, and a fourth corner portion which includes an intersection point between the second end portion 303 and the fourth end portion 305 of the first body portion 30.

In the first adjacent member 3 in this embodiment, the restricting members 310 disposed along the first corner portion and the restricting members 310 disposed along the second corner portion are independent from each other, while the restricting members 310 disposed along the third corner portion and the restricting members 310 disposed along the fourth corner portion are continuously connected to each other by way of restricting members 310 extending along the fourth end portion 305.

With such a configuration, the restricting members 310 of the first restricting portions 31 are arranged in peripheries of the cases 20 of the energy storage devices 2 disposed adjacently to the first adjacent member 3 thus restricting the movement of the energy storage devices 2 in the Y axis direction as well as in the Z axis direction.

In the first adjacent member 3, the projecting portions 32 are formed on both surfaces of the first body portion 30 in the X axis direction. That is, the first adjacent member 3 includes: the projecting portions 32 which project from the first surface 300 of the first body portion 30; and the projecting portions 32 which project from the second surface 301 of the first body portion 30. In this embodiment, the first adjacent member 3 includes the plurality of projecting portions 32 formed on the first surface 300 and the second surface 301 of the first body portion 30 respectively.

The plurality of respective projecting portions 32 extend in the Y axis direction, and are arranged at intervals in the Z axis direction. Heights of the plurality of projecting portions 32 on a common surface (the first surface 300 or the second surface 301) are set to the same height. That is, the height of the plurality of projecting portions 32 is set to a height at which the plurality of projecting portions 32 are uniformly brought into contact with a planar outer surface directed in the X axis direction of the case 20 of the energy storage device 2 which is disposed adjacently to the first adjacent member 3. With such a configuration, each of the plurality of projecting portions 32 on the common surface (the first surface 300 or the second surface 301) forms a flow channel between one projecting portion 32 and another projecting portion 32 disposed adjacently to one projecting portion 32.

Figure 7:
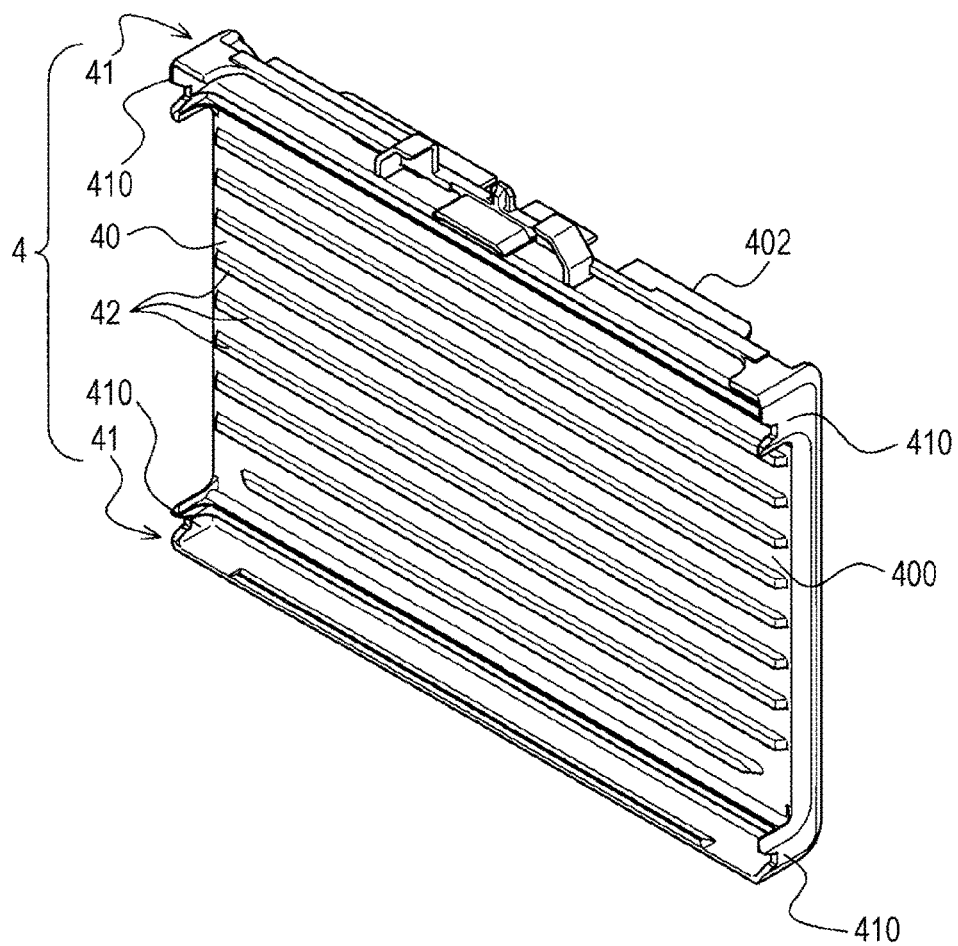
FIG. 7 is an entire perspective view of a second adjacent member used in the energy storage apparatus as viewed from a first surface side.
Figure 8:
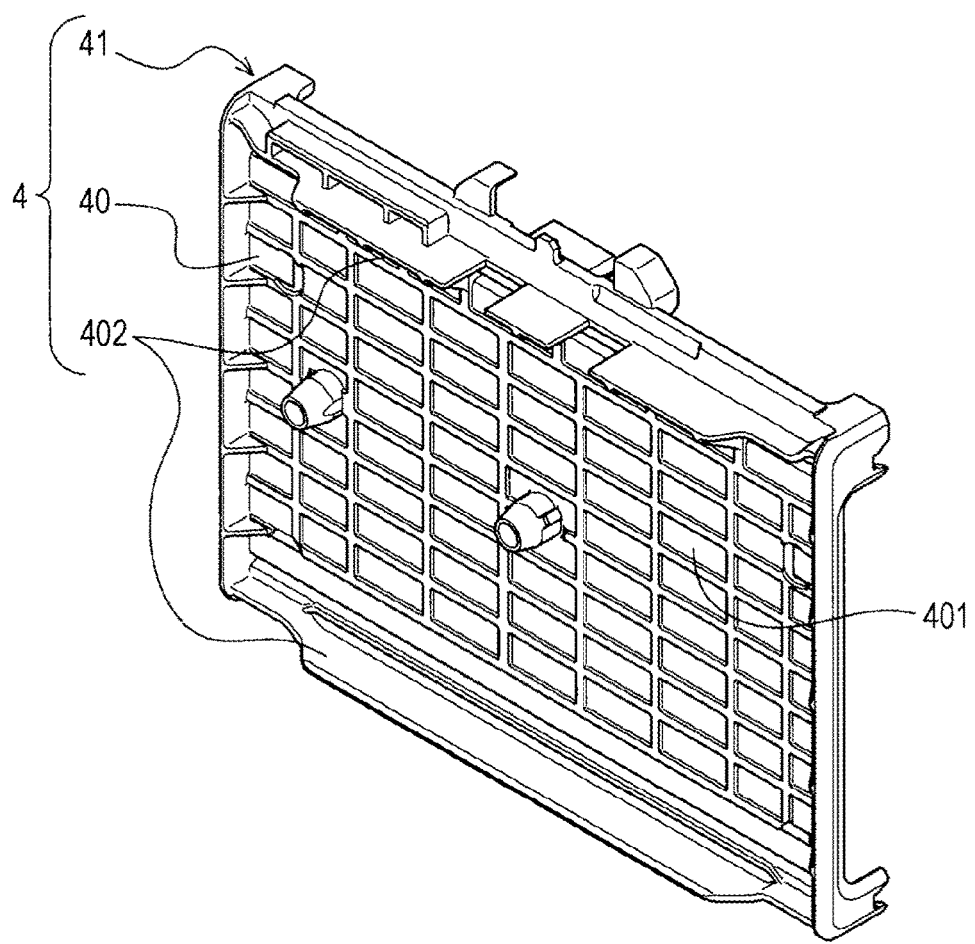
FIG. 8 is an entire perspective view of the second adjacent member used in the energy storage apparatus as viewed from a second surface side.
Figure 8:
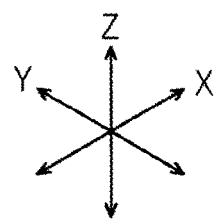

As shown in FIG. 7 and FIG. 8, each second adjacent member 4 has the body portion (hereinafter referred to as "second body portion") 40 disposed adjacently to the energy storage device 2 disposed at the outermost end in the X axis direction of the unit formed of the plurality of energy storage devices 2.

The second adjacent member 4 includes restricting portions (hereinafter referred to as "second restricting portions") 41 which prevent the positional displacement of the energy storage device 2 disposed adjacently to the second body portion 40. In this embodiment, the second adjacent member 4 includes projecting portions 42 provided for forming flow channels which allow cooling air for cooling the energy storage device 2 to pass therethrough between the second adjacent member 4 and the energy storage device 2 disposed adjacently to the second adjacent member 4.

The second body portion 40 has a first surface 400 and a second surface 401 disposed on a side opposite to the first surface 400 in the X axis direction. The second body portion 40 is formed into a quadrangular shape as viewed in the X axis direction. That is, the second body portion 40 is formed to have substantially the same shape and the same size as a surface of the case 20 of the energy storage device 2 which is directed in the X axis direction.

In this embodiment, the second adjacent member 4 includes positioning portions 402 provided for positioning the second adjacent member 4 with respect to the holder 6. To be more specific, the second adjacent member 4 includes the positioning portions 402 which are engageable with the holder 6 (an end member 61 described later) disposed adjacently to the second adjacent member 4 in the X axis direction, and project in the X axis direction from the second surface 401 of the second body portion 40 (see FIG. 8).

As shown in FIG. 7, each second restricting portion 41 includes a restricting member 410 extending in the X axis direction along an outer edge of the second body portion 40. The restricting member 410 of the second restricting portion 41 extends toward the outside in the X axis direction from the first surface 400 of the second body portion 40. The restricting member 410 of the second restricting portion 41 is disposed along at least four corners (four corner portions) of the second body portion 40 respectively. With such a configuration, the restricting members 410 of the second restricting portions 41 are arranged in a periphery of the case 20 of the energy storage device 2 disposed adjacently to the second adjacent member 4 thus restricting the movement of the energy storage device 2 in the Y axis direction as well as in the Z axis direction.

In the second adjacent member 4, the projecting portions 42 are formed on the first surface 400 of the second body portion 40 which is directed in the X axis direction. In this embodiment, the second adjacent member 4 includes the plurality of projecting portions 42 on the first surface 400 of the second body portion 40. The plurality of respective projecting portions 42 extend in the Y axis direction, and are arranged at intervals in the Z axis direction. Heights of the plurality of projecting portions 42 on a common surface (the first surface 400) are set to the same height. That is, the height of the plurality of projecting portions 42 is set to a height at which the plurality of projecting portions 42 are uniformly brought into contact with a planar outer surface directed in the X axis direction of the case 20 of the energy storage device 2 which is disposed adjacently to the second adjacent member 4. With such a configuration, each of the plurality of projecting portions 42 on the common surface (the first surface 400) forms a flow channel between one projecting portion 42 and another projecting portion 42 disposed adjacently to one projecting portion 42.

Figure 9:
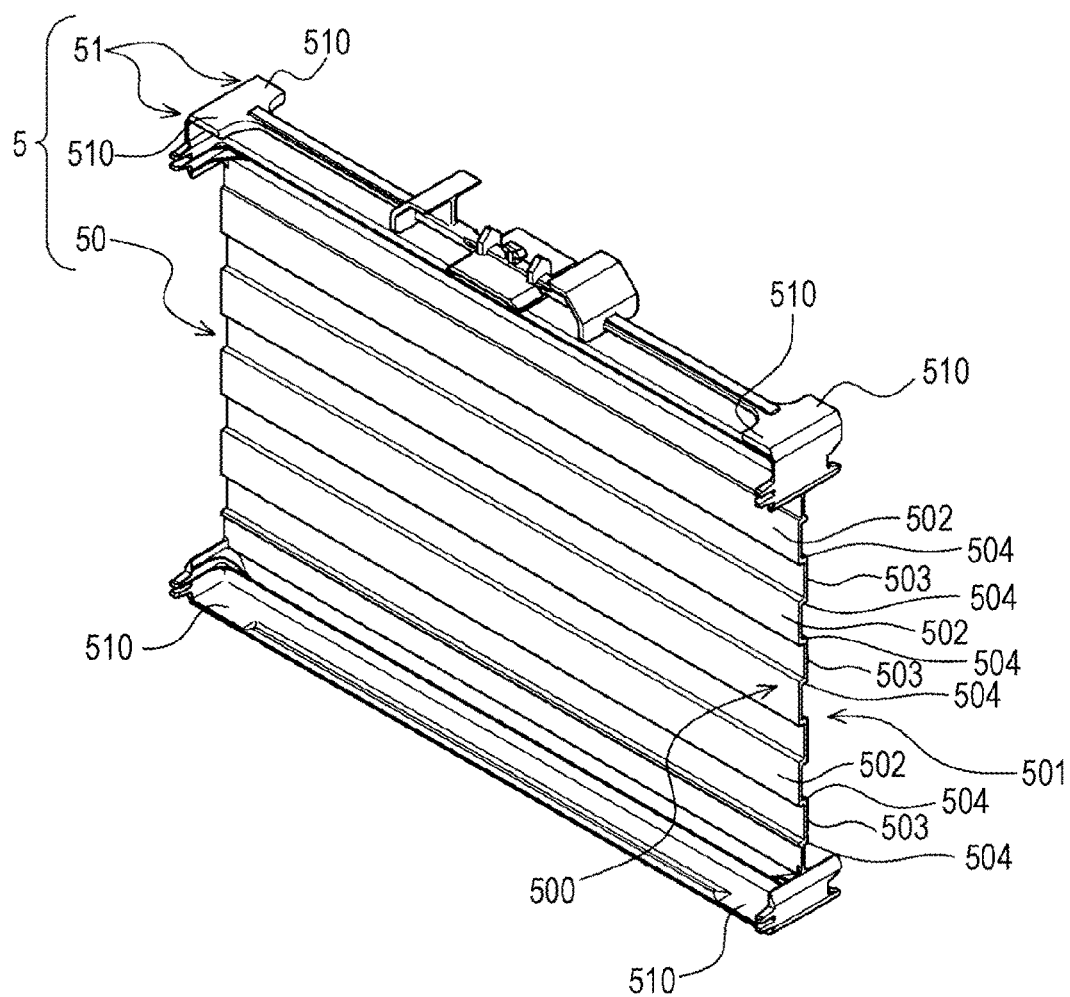
FIG. 9 is an entire perspective view of a third adjacent member used in the energy storage apparatus as viewed from a first surface side.
Figure 9:
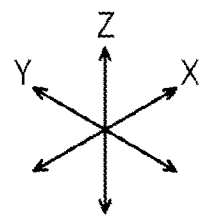
Figure 10:
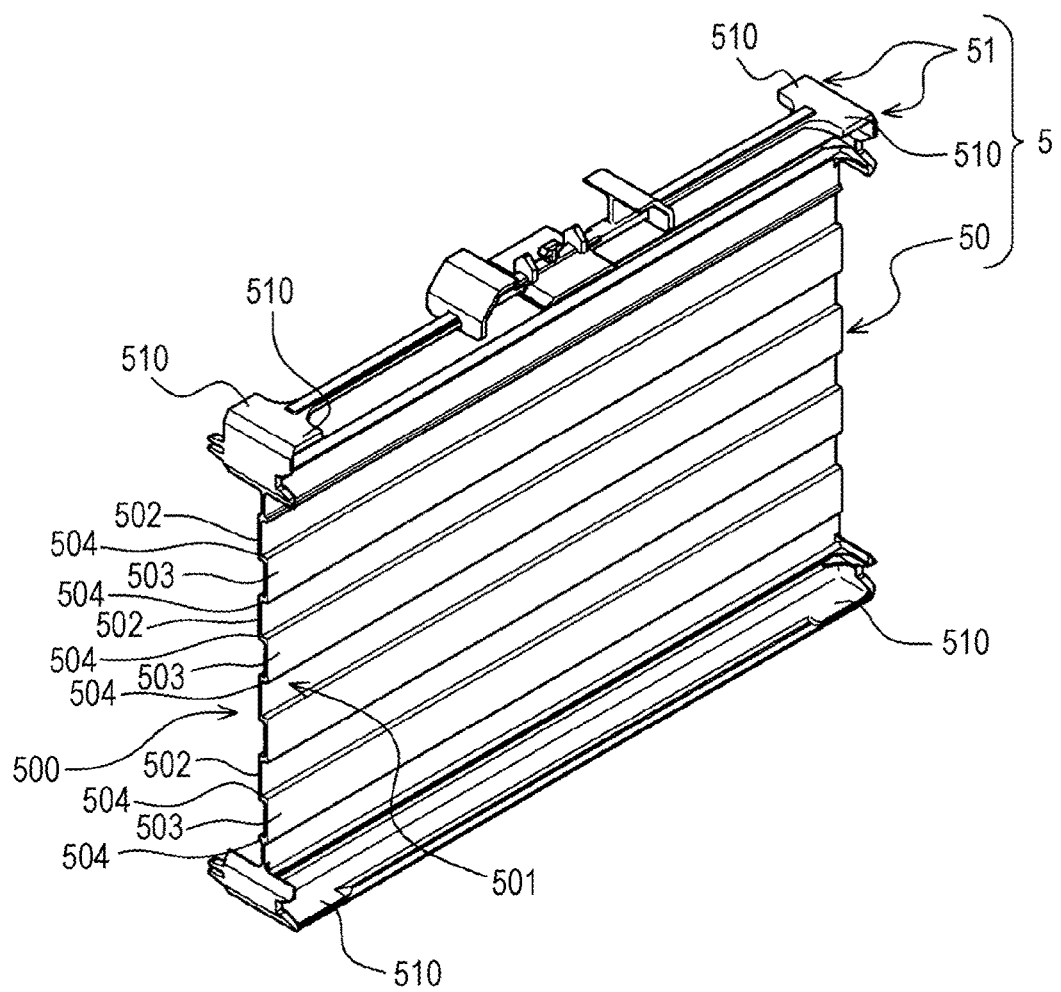
FIG. 10 is an entire perspective view of the third adjacent member used in the energy storage apparatus as viewed from a second surface side.
Figure 10:
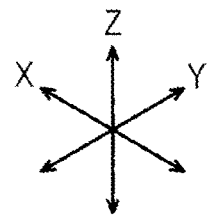

As shown in FIG. 9 and FIG. 10, each third adjacent member 5 has the body portion (hereinafter referred to as "third body portion") 50 disposed adjacently to the energy storage device 2 disposed between the first adjacent member 3 and the second adjacent member 4. That is, each third adjacent member 5 has the third body portion 50 disposed between two energy storage devices 2 disposed adjacently to each other between the first adjacent member 3 and the second adjacent member 4. The third adjacent member 5 includes restricting portions (hereinafter referred to as "third restricting portions") 51 which prevent the positional displacement of the energy storage devices 2 disposed adjacently to the third body portion 50.

The third body portion 50 has a first surface 500 and a second surface 501 disposed on a side opposite to the first surface 500 in the X axis direction. The third body portion 50 is formed into a quadrangular shape as viewed in the X axis direction. That is, the third body portion 50 is formed to have substantially the same shape and the same size as the surface of the case 20 of the energy storage device 2 which is directed in the X axis direction. The third body portion 50 has a rectangular corrugated shape in cross section as viewed in the Y axis direction.

To be more specific, the third body portion 50 includes: a plurality of first contact portions 502; a plurality of second contact portions 503; and a plurality of connection portions 504. The plurality of first contact portions 502 are arranged at intervals in the Z axis direction, and are brought into contact with the case 20 of the energy storage device 2 disposed adjacently to the third adjacent member 5 on one side in the X axis direction. The plurality of second contact portions 503 are positioned between the plurality of first contact portions 502 such that the second contact portion 503 and the first contact portion 502 are alternately arranged, and the second contact portions 503 are displaced in the X axis direction with respect to the first contact portions 502, and are brought into contact with the case 20 of the energy storage device 2 disposed adjacently to the third adjacent member 5 on the other side in the X axis direction. Each of the plurality of connection portions 504 connects edge portions of the first contact portion 502 and the second contact portion 503 which correspond to each other in the Z axis direction to each other. With such a configuration, the third body portion 50 forms flow channels which allow cooling air for cooling the energy storage device 2 to pass therethrough between the connection portions 504 arranged at intervals in the Z axis direction (between the case 20 of the energy storage device 2 disposed adjacently to the third adjacent member 5 on one side and the second contact portions 503 and between the case 20 of the energy storage device 2 disposed adjacently to the third adjacent member 5 on the other side and the first contact portions 502).

The third restricting portion 51 includes restricting members 510 extending in the X axis direction along an outer edge of the third body portion 50. To describe the configuration more specifically, the third adjacent member 5 includes the pairs of third restricting portions 51 which restrict two energy storage devices 2 disposed adjacently to the third adjacent member 5 in the X axis direction.

The respective restricting members 510 of each pair of third restricting portions 51 extend in the directions opposite to each other in the X axis direction from the third body portion 50. That is, the restricting member 510 of one third restricting portion 51 extends toward the outside in the X axis direction from the first surface 500 of the third body portion 50, while the restricting member 510 of the other third restricting portion 51 extends toward the outside in the X axis direction from the second surface 501 of the third body portion 50. The restricting members 510 of the pair of third restricting portions 51 are disposed along at least four corners (four corner portions) of the third body portion 50 respectively. With such a configuration, the restricting members 510 of the third restricting portions 51 are arranged in peripheries of the cases 20 of the energy storage devices 2 disposed adjacently to the third adjacent member 5 thus restricting the movement of the energy storage devices 2 in the Y axis direction as well as in the Z axis direction.

In this embodiment, each third adjacent member 5 is engaged by fitting with another third adjacent member 5 disposed adjacently to the third adjacent member 5 with the energy storage device 2 interposed therebetween in a contact state or in a non-contact state. That is, the third restricting portions 51 (restricting members 510) of one third adjacent member 5 are engaged by fitting with the third restricting portions 51 (restricting members 510) of another third adjacent member 5 with the energy storage device 2 interposed therebetween in a contact state or in a non-contact state.

Each third adjacent member 5 disposed adjacently to the first adjacent member 3 with the energy storage device 2 interposed therebetween is engaged by fitting with the first adjacent member 3 in a contact state or in a non-contact state. That is, the third restricting portions 51 (restricting members 510) of each third adjacent member 5 disposed adjacently to the first adjacent member 3 with the energy storage device 2 interposed therebetween are engaged by fitting with the first restricting portions 31 (restricting members 310) of the first adjacent member 3 in a contact state or in a non-contact state.

Each third adjacent member 5 disposed adjacently to the second adjacent member 4 with the energy storage device 2 interposed therebetween is engaged by fitting with the second adjacent member 4 in a contact state or in a non-contact state. That is, the third restricting portions 51 (restricting members 510) of each third adjacent member 5 disposed adjacently to the second adjacent member 4 with the energy storage device 2 interposed therebetween are engaged by fitting with the second restricting portions 41 (restricting members 410) of the second adjacent member 4 in a contact state or in a non-contact state.

Returning to FIG. 2, the holder 6 includes: the oppositely facing members 60 each of which oppositely faces the plurality of energy storage devices 2 in the Y axis direction; and the end members 61 which are connected to the oppositely facing members 60 and sandwich the energy storage devices 2 together with the first adjacent member 3.

To be more specific, the holder 6 includes: the pair of oppositely facing members 60; and the pair of end members 61. The pair of oppositely facing members 60 is disposed such that the oppositely facing members 60 sandwich the plurality of energy storage devices 2 therebetween in the Y axis direction, and the pair of oppositely facing members 60 extends in the X axis direction respectively. The pair of end members 61 is disposed such that the end members 61 are made to overlap with the respective second adjacent members 4 from the outside in the X axis direction, and each of the pair of end members 61 is connected to the pair of oppositely facing members 60.

Each of the pair of oppositely facing members 60 includes: a pair of beam portions 600 each extending in the X axis direction which is disposed in a spaced-apart manner in the Z axis direction; a first connection portion 601 which connects the pair of beam portions 600 to each other at an intermediate position in the X axis direction and supports the first adjacent member 3; and a pair of second connection portions 602 each of which connects end portions of the pair of beam portions 600 to each other and to which the end members 61 are respectively connected. In this embodiment, each oppositely facing member 60 includes third connection portions 603 which connect the pair of beam portions 600 to each other between the first connection portion 601 and the second connection portions 602.

Each of the pair of beam portions 600 is disposed along corner portions of the cases 20 of the plurality of energy storage devices 2 arranged in a row in the X axis direction. Accordingly, each of the pair of beam portions 600 is formed into a bent shape in cross section in conformity with the corner portions of the cases 20. To be more specific, each of the pair of beam portions 600 includes a strip-shaped first piece 604 and a strip-shaped second piece 605. The first piece 604 has a first end and a second end disposed on a side opposite to the first end of the first piece 604 in the Z axis direction. The first piece 604 extends in the X axis direction. The second piece 605 has a first end and a second end in the Y axis direction, wherein the first end of the second piece 605 is connected to the first end of the first piece 604, and the second end of the second piece 605 is disposed on a side opposite to the first end of the second piece 605. The second piece 605 extends in the X axis direction. The first piece 604 of the beam portion 600 opposedly faces outer surfaces of the cases 20 of the energy storage devices 2 which is directed in the Y axis direction, and the second piece 605 of the beam portion 600 opposedly faces outer surfaces of the cases 20 of the energy storage devices 2 which is directed in the Z axis direction.

The first connection portion 601 extends in the Z axis direction. The first connection portion 601 has through holes 606, 607, 608 at positions which correspond to the first connection portion 306, the second connection portions 307, and the shaft portion 308 of the first adjacent member 3. That is, the first connection portion 601 has: the first through hole 606 which corresponds to the first connection portion 306; the second through holes 607 which correspond to the second connection portions 307; and the third through hole 608 which corresponds to the shaft portion 308. The first through hole 606 is formed such that the male threaded member 110 which is threadedly engaged with the first connection portion 306 can pass through the first through hole 606. Each of the second through holes 607 is formed such that a male threaded member (not shown in the drawing) which is threadedly engaged with the second connection portion 307 can pass through the second through hole 607. The third through hole 608 which corresponds to the shaft portion 308 is formed such that the shaft portion 308 can be inserted into the third through hole 608 and an inner peripheral surface of the third through hole 608 which defines the third through hole 608 is engaged with an outer peripheral surface of the inserted shaft portion 308. In this embodiment, the third through hole 608 is formed of an elongated hole which extends in the Z axis direction, and allows the movement and the rotation of the inserted shaft portion 308.

Each second connection portion 602 has: a connection piece 609 which is connected to the first pieces 604 of the pair of beam portions 600; and a fixed piece 610 which extends in the Y axis direction from the connection piece 609 and is fixed to the end member 61. Each fixed piece 610 covers the end member 61 which is made to overlap with the second adjacent member 4 from the outside. Along with such a configuration, the fixed piece 610 has through holes 611 through which male threaded members 115 for connecting (fixing) the fixed piece 610 to the end member 61 are made to pass.

In this embodiment, each opposedly facing member 60 is formed into a frame shape by the beam portions 600, the first connection portion 601, the second connection portions 602, and the third connection portions 603. That is, the opposedly facing member 60 defines ventilation openings 613 which allow cooling air to pass therethrough in the Y axis direction.

Each of the pair of end members 61 is formed with substantially the same shape and the same size as the second body portion 40 of the second adjacent member 4 as viewed in the X axis direction. The end member 61 is formed such that the end member 61 is brought into face contact with the fixed pieces 610 of the second connection portions 602 of the opposedly facing members 60. Along with such a configuration, the end member 61 has threaded holes 612 with which male threaded members 115 are threadedly engaged at positions which correspond to the through holes 611 formed in the fixed pieces 610. To fix the energy storage apparatus 1 according to this embodiment to equipment of an automobile or the like which uses the energy storage apparatus 1 as a power source, each end member 61 has fixing members (male threaded members in this embodiment) 620 for fixing the energy storage apparatus 1 to the equipment.

Each holder 6 is made of a material having conductivity (metal in general). Accordingly, each insulator 7 provides electrical insulation between the plurality of energy storage devices 2 arranged in a row in the X axis direction and the holder 6. That is, the insulator 7 covers at least a region of the opposedly facing member 60 which opposedly faces the plurality of energy storage devices 2. In this embodiment, the insulator 7 covers the entire second pieces 605 of the pair of beam portions 600 which extend in the X axis direction in addition to surfaces of the pair of beam portions 600, surfaces of the first connection portion 601, surfaces of the second connection portions 602 and surfaces of the third connection portions 603 which are directed to an energy storage device 2 side.

The bus bars 8, 9 are disposed such that each bus bar 8, 9 straddles over the external terminals 21 of two energy storage devices 2 disposed adjacently to each other in the X axis direction. In this embodiment, the bus bar 8, 9 is mechanically and electrically connected to the external terminals 21 by welding. In this embodiment, the energy storage apparatus 1 includes the first adjacent member 3, and the first adjacent member 3 divides the plurality of energy storage devices 2 into two blocks. Accordingly, the energy storage apparatus 1 includes, as bus bars, the first bus bars 8 each of which connects two energy storage devices 2 within the same block to each other, and the second bus bar 9 which is provided between the energy storage devices 2 disposed adjacently to each other with the first adjacent member 3 interposed therebetween, and is provided for connecting the energy storage devices belonging to two blocks to each other.

The first bus bars 8 and the second bus bar 9 are mechanically and electrically connected by welding to the external terminals 21 of the energy storage devices 2 which are objects to be connected to each other. The external terminals 21 of the plurality of energy storage devices 2 are disposed at the same level in the Z axis direction. Accordingly, the first bus bars 8 which connect the energy storage devices 2 to each other within the same block are formed into a plate shape. The second bus bar 9 is formed into a shape where a center portion of the second bus bar 9 is raised from both end portions of the second bus bar 9 so as to straddle over the first adjacent member 3.

The energy storage apparatus 1 of this embodiment is configured as described above. In this embodiment, the first adjacent member 3, the second adjacent members 4 and the third adjacent members 5 are respectively formed by molding where a resin is injected into a molding space formed by fastening a plurality of dies.

Figure 11:
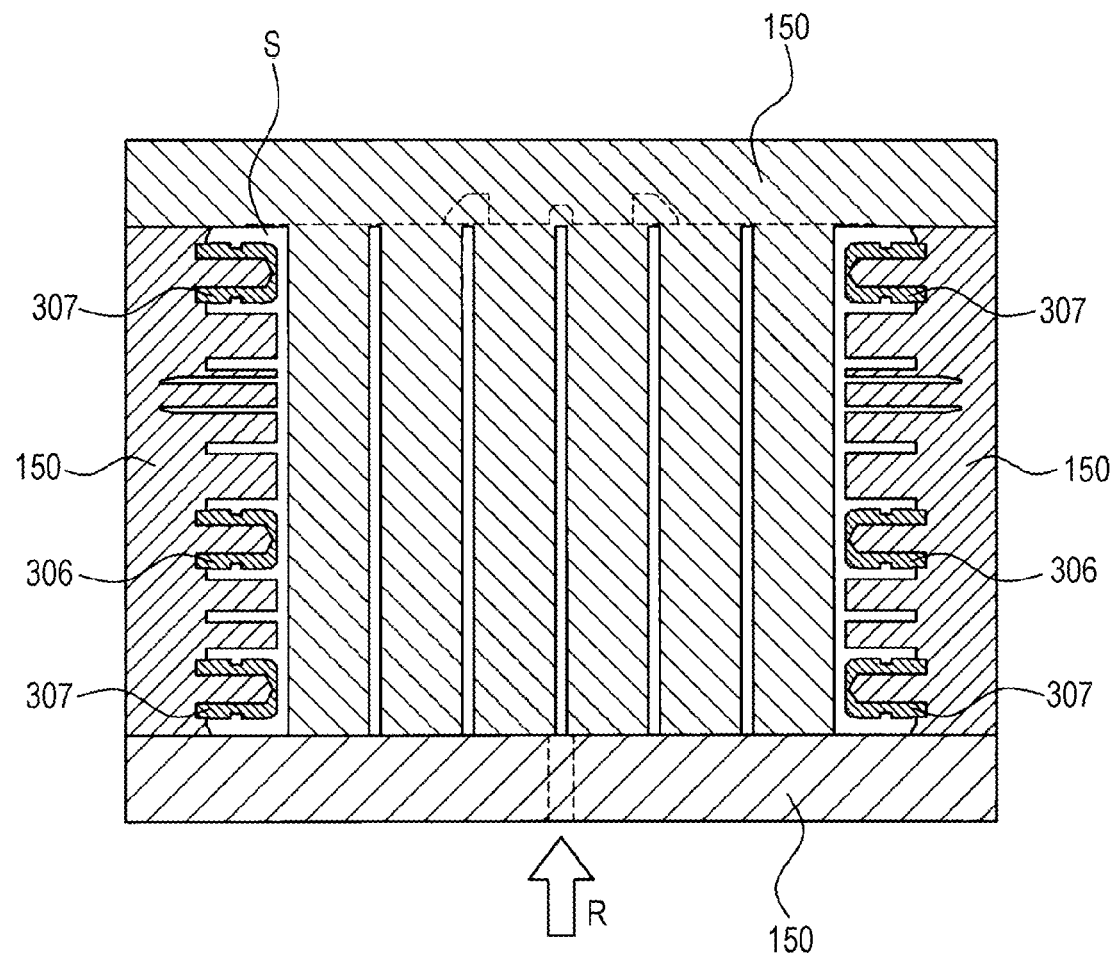
FIG. 11 is a view showing a state when the first adjacent member is formed by molding.

In the first adjacent member 3, the first connection portions 306 and the second connection portions 307 are respectively formed of a female threaded member made of metal. Accordingly, as shown in FIG. 11, the first adjacent member 3 is formed by molding such that the female threaded members which will be used as the first connection portions 306 and the second connection portions 307 are disposed in the molding space S formed by fastening a plurality of dies 150 and, thereafter, a resin R is injected into the molding space S.

That is, the first adjacent member 3 is formed by so-called insert molding where metal parts 306, 307 are inserted into the resin R along with the resin molding.

In the first adjacent member 3, the first body portion 30 has a thickness in the X axis direction and hence, usually, shrinkage of a thickness occurs when the first adjacent member 3 is formed by resin molding. That is, due to a change in temperature after molding, a thickness of the first adjacent member 3 is partially reduced so that molding accuracy of the first adjacent member 3 is deteriorated.

However, the first adjacent member 3 according to this embodiment has the first cavity portions 311 and the second cavity portions 312. As a result, the first adjacent member 3 has a small thickness as a whole. Accordingly, there is no possibility that shrinkage of a thickness occurs after molding. Particularly, considering the case where the first connection portions 306 are disposed at symmetrical positions, when cavity portions extending in the Y axis direction are formed on the first adjacent member 3, the first adjacent member 3 has a large thickness between the pair of first connection portions 306. As a result, shrinkage of a thickness occurs in a portion of the first adjacent member 3 between the pair of first connection portions 306. On the other hand, according to the above-mentioned embodiment, the first cavity portions 311 and the second cavity portions 312 which extend in two directions respectively are formed on the first adjacent member 3. As a result, thick wall portions are formed only at portions of the first adjacent member 3 which support the female threaded members and hence, shrinkage of a thickness can be prevented.

Figure 12:
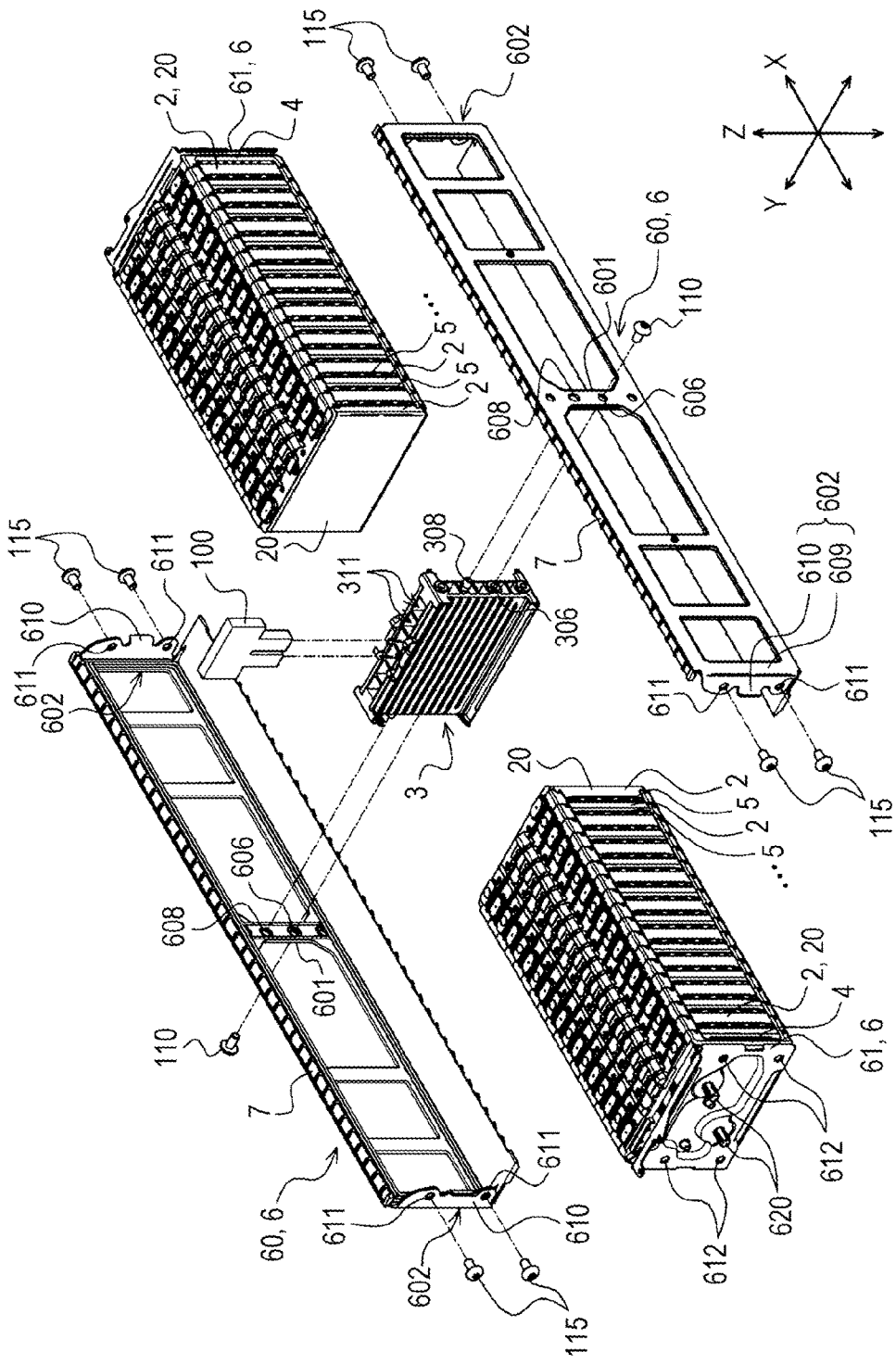
FIG. 12 is a perspective view for describing a method for manufacturing the energy storage apparatus.

Next, a method for manufacturing the energy storage apparatus 1 is described. First, as shown in FIG. 12, the first adjacent member 3 is held by a jig 100 by inserting the jig 100 into first cavity portions 311 of the first adjacent member 3. Then, the jig 100 is maintained at a fixed position so that the first adjacent member 3 maintains a posture where the first adjacent member 3 can be connected to oppositely facing members 60 and energy storage devices 2 can be disposed along the first body portion 30. In such a state, the energy storage devices 2 are disposed adjacently to the first adjacent member 3 in the X axis direction. In this embodiment, the energy storage device 2 is disposed in each of two regions divided by the first adjacent member 3 in the X axis direction, and each energy storage device 2 is disposed adjacently to the first adjacent member 3.

Then, in each of two regions formed by dividing all energy storage devices 2 in two in the X axis direction, the energy storage device 2 and the third adjacent member 5 are alternately arranged in the X axis direction. Then, the second adjacent members 4 are made to overlap with the cases 20 of the respective energy storage devices 2 disposed at the outermost ends, and the end members 61 are made to overlap with the respective second adjacent members 4.

In this embodiment, the energy storage devices 2 are disposed adjacently to the first adjacent member 3 and, thereafter, the energy storage device 2 and the third adjacent member 5 are sequentially and alternately made to overlap with each other and, then, the second adjacent members 4 and the end members 61 are made to overlap with each other. However, it may be possible to adopt the following configuration. That is, a single block is prepared by making the energy storage device 2 and the third adjacent member 5 alternately overlap with each other and by making the second adjacent members 4 and the end members 61 overlap with each other. Then the blocks may be arranged such that the energy storage device 2 is disposed adjacently to the first adjacent member 3.

As described above, the first adjacent member 3 is maintained by the jig 100 in a posture where the first adjacent member 3 can be connected to the oppositely facing members 60 of the holder 6. Accordingly, the first through holes 606 formed in the first connection portions 601 of the oppositely facing members 60 which are disposed adjacently to the first adjacent member 3 in the Y axis direction and the first connection portions 306 are made coaxial with each other.

Figure 13:
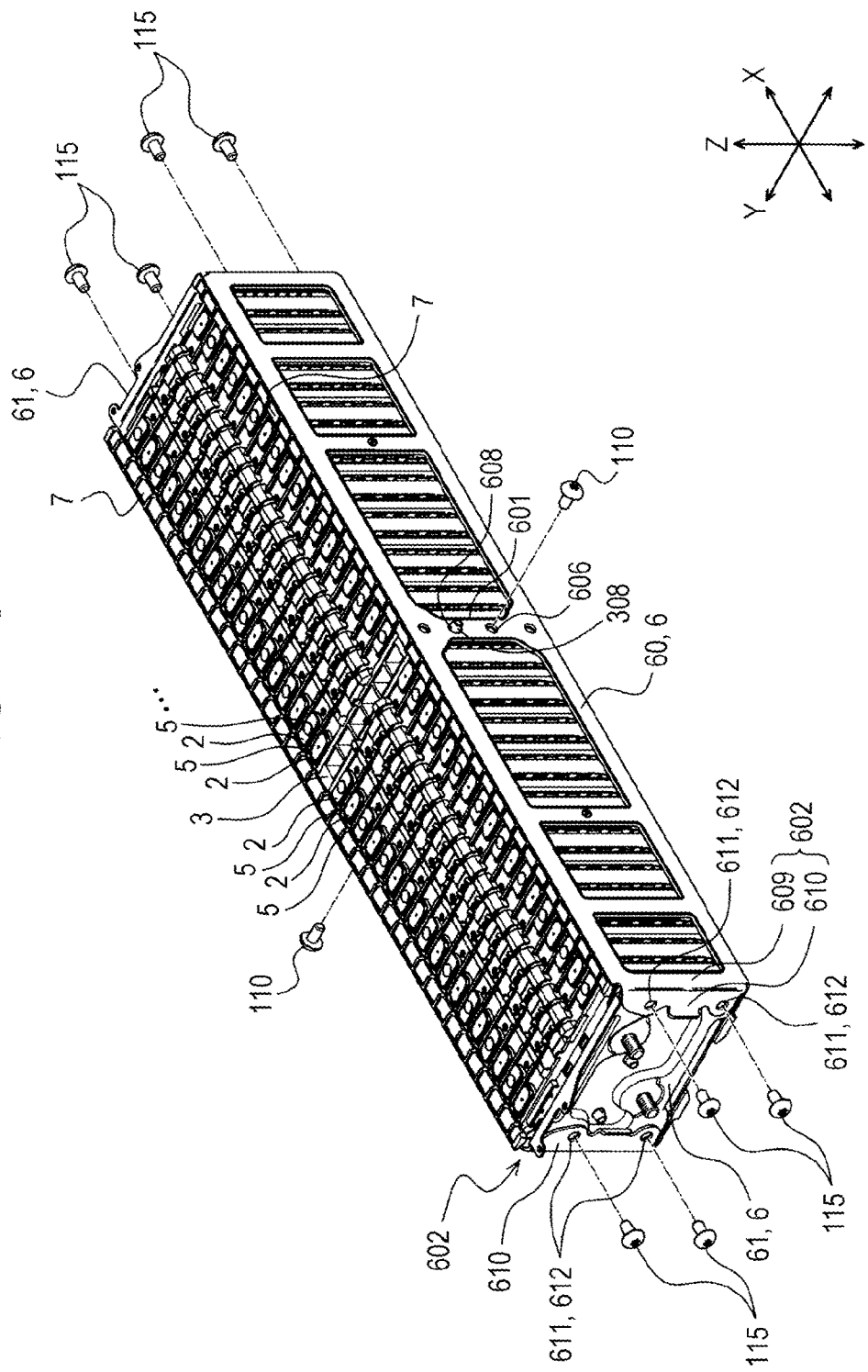
FIG. 13 is a perspective view for describing the method for manufacturing the energy storage apparatus.

In this embodiment, the first adjacent member 3 includes shaft portions 308 and hence, as described above, the shaft portions 308 of the first adjacent member 3 and third through holes 608 which are formed in the oppositely facing member 60 are also made coaxial with each other. Along with such a configuration, in this embodiment, as shown in FIG. 13, the shaft portions 308 are inserted into the third through holes (elongated holes) 608 as a pre-stage for making the male threaded members 110 threadedly engaged with each first connection portions 306.

Figure 14:
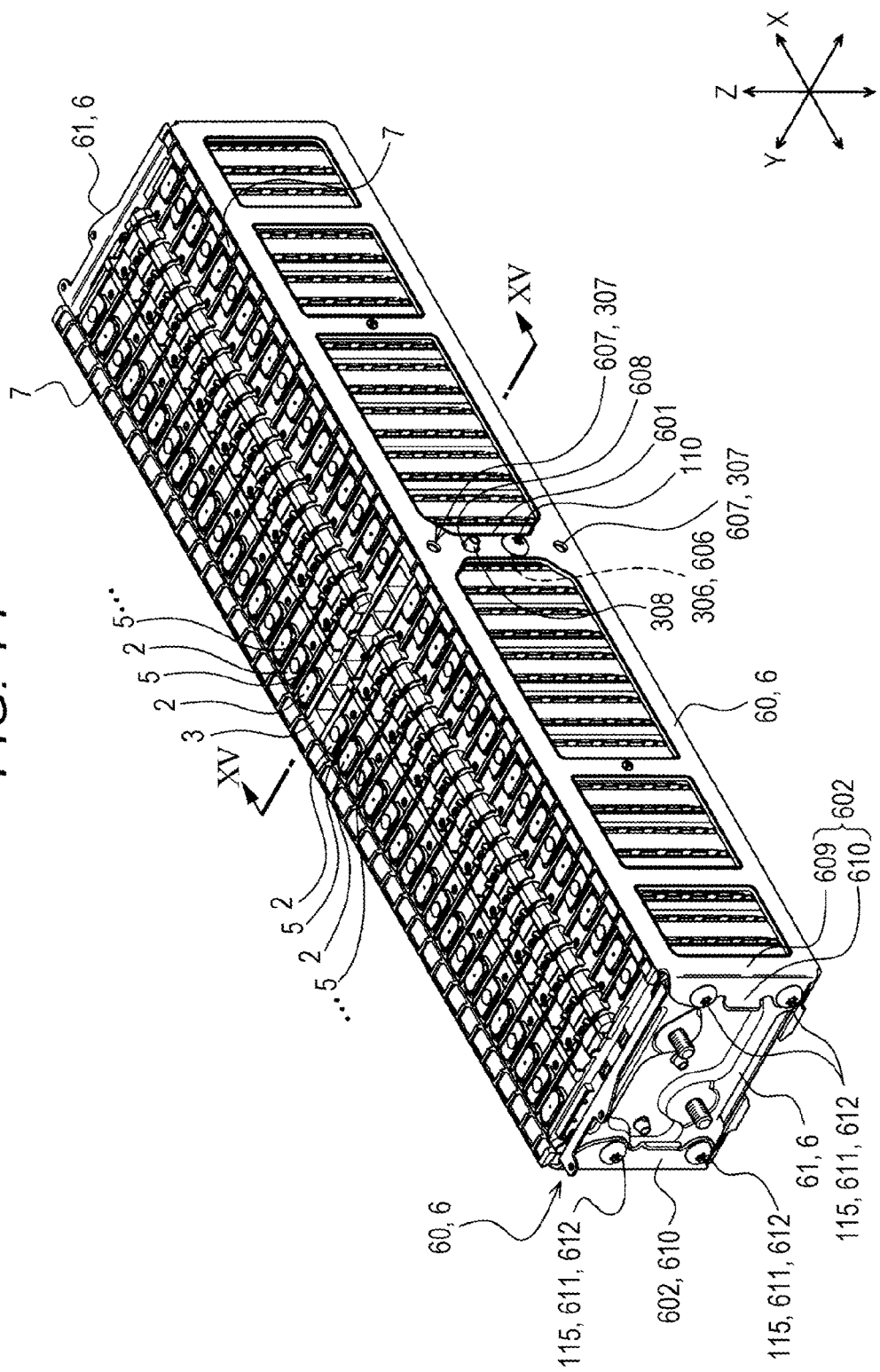
FIG. 14 is a perspective view for describing the method for manufacturing the energy storage apparatus.
Figure 15:
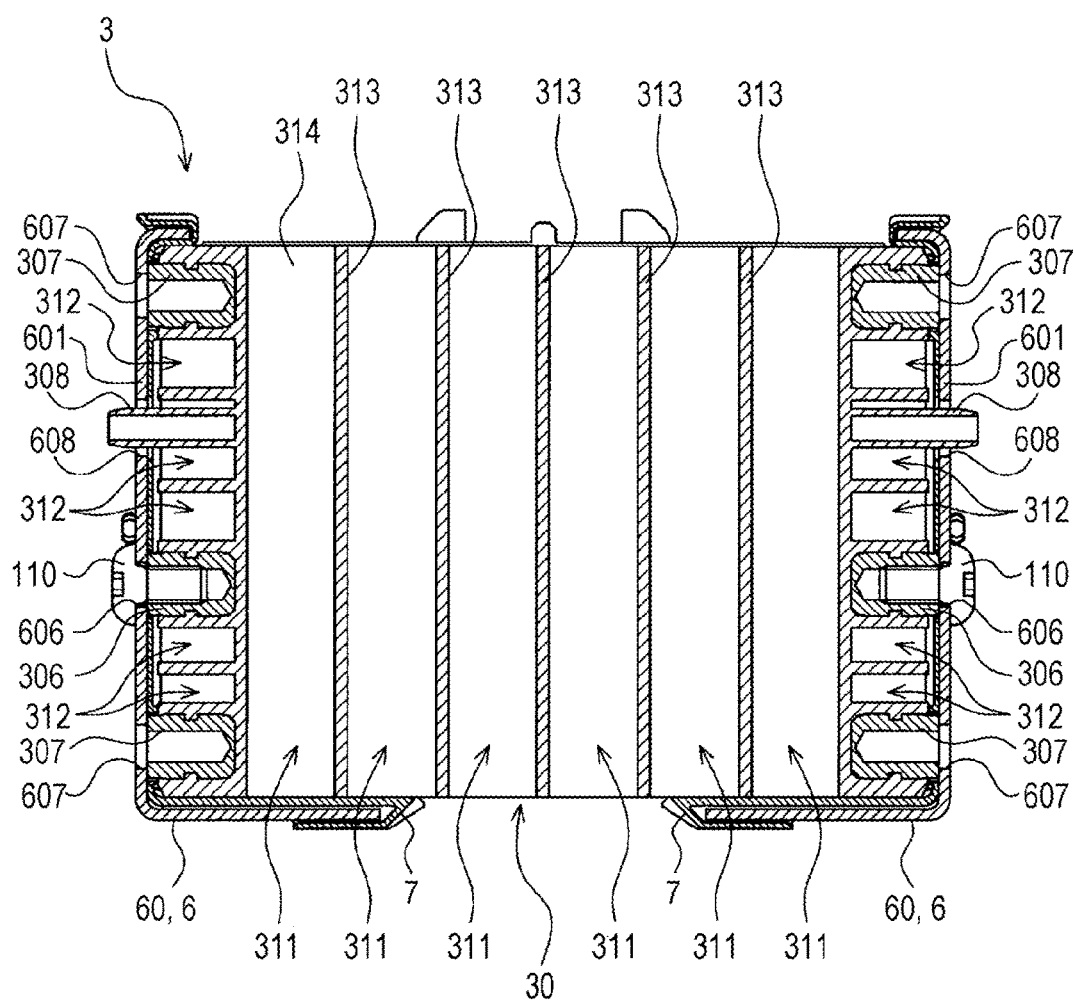
FIG. 15 is a cross-sectional view taken along a line XV-XV in FIG. 14.

Then, as shown in FIG. 14 and FIG. 15, the male threaded members 110 are made to pass through the first through holes 606 formed in the first connection portions 601, and are threadedly engaged with the first connection portions 306. In this embodiment, the male threaded members 110 are not completely fastened in this state so that the first adjacent member 3 is temporarily fixed to the oppositely facing members 60.

In this embodiment, the holder 6 includes the pair of oppositely facing members 60. Accordingly, the first connection portion 306 formed on one end portion of a first body portion 30 of first adjacent member 3 in the Y axis direction is temporarily fixed to one oppositely facing member 60. The first connection portion 306 formed on the other end portion of the first body portion 30 of the first adjacent member 3 in the Y axis direction is temporarily fixed to the other oppositely facing member 60. Insulators 7 are mounted on the oppositely facing members 60 in advance before the first adjacent member 3 is fixed (temporarily fixed) to the oppositely facing members 60.

When the first adjacent member 3 is temporarily fixed to the oppositely facing members 60 as described above, as shown in FIG. 14, a state is brought about where fixed pieces 610 of second connection portions 602 of the oppositely facing members 60 are made to overlap with the respective end members 61 from the outside.

In this state, the end members 61 and the oppositely facing members 60 are connected to each other. That is, the male threaded members 115 are made to pass through the through holes 611 formed in the fixed pieces 610, and are threadedly engaged with threaded holes 612 formed in the respective end members 61. By making the male threaded members 115 threadedly engaged with the threaded holes 612, the plurality of energy storage devices 2 are pressurized to the first adjacent member 3 by the end members 61 in a state where the plurality of energy storage devices 2 are positioned by the first adjacent member 3. That is, the first adjacent member 3 functions as a positioning member which performs the positioning of the energy storage devices 2.

The first adjacent member 3 is in a temporarily-fixed state with respect to the oppositely facing members 60 so that the posture or the position of the first adjacent member 3 can be changed corresponding to a pressurized state of the energy storage devices 2 using the shaft portions 308 loosely inserted into the first through holes 606 formed in the opposedly facing members 60 as the reference (fulcrum). With such operations, a state is brought about where a pressure in the X axis direction is uniformly applied to the energy storage devices 2, the second adjacent members 4, the third adjacent members 5 and the end members 61. When the energy storage devices 2, the second adjacent members 4, the third adjacent members 5 and the end members 61 are brought into a pressurized state as described above, the male threaded members 110 which are threadedly engaged with the first connection portions 306 of the first adjacent member 3 are fastened and hence, the first adjacent member 3 is firmly fixed to the opposedly facing members 60 (holder 6).

Figure 16:
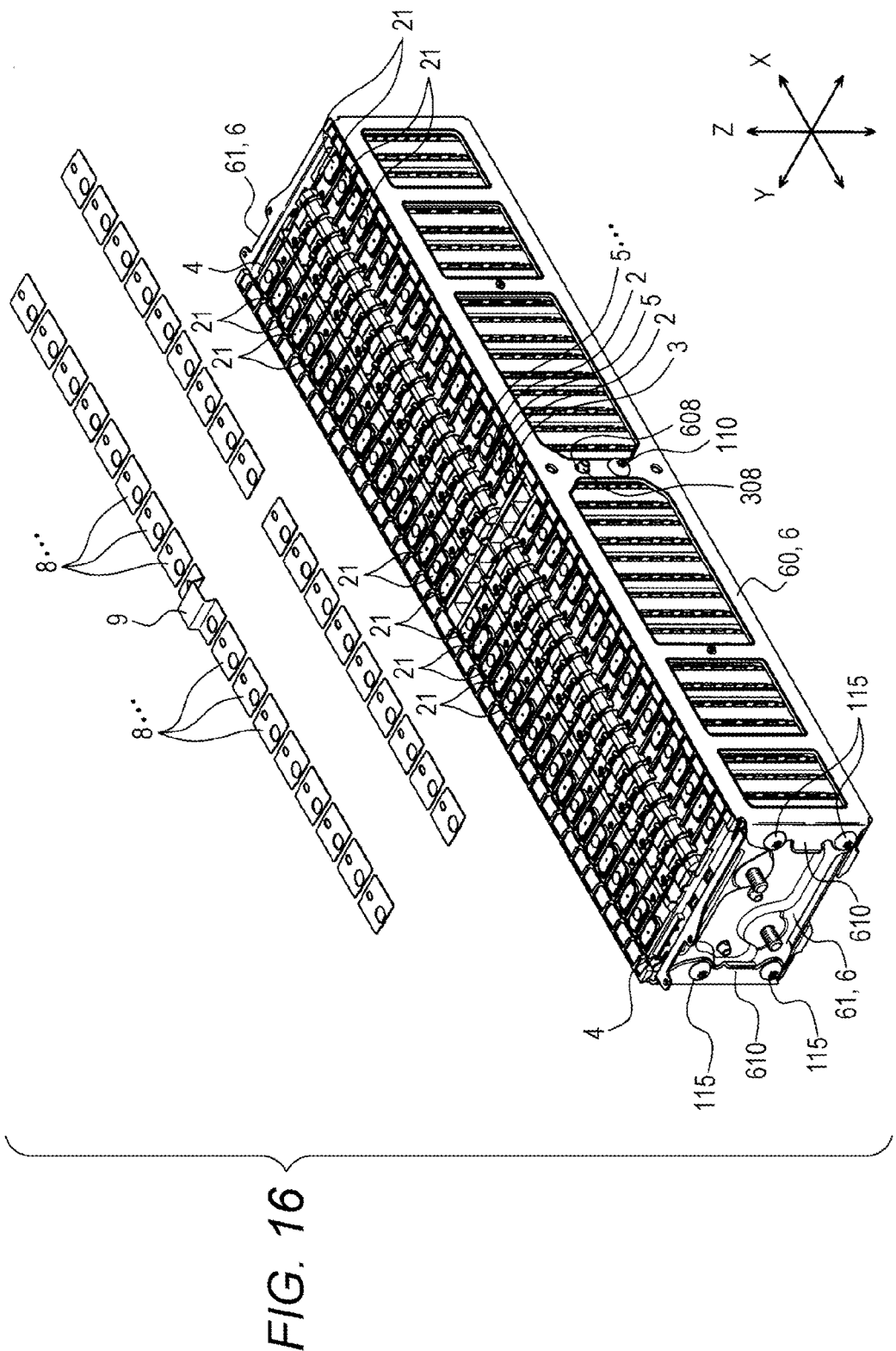
FIG. 16 is a perspective view for describing the method for manufacturing an energy storage apparatus.

Thereafter, as shown in FIG. 16, bus bars 8, 9 (the first bus bars 8, the second bus bar 9) are disposed such that each bus bar 8, 9 straddles over the external terminals 21 of two energy storage devices 2 disposed adjacently to each other, and is welded to the external terminals 21. With such operations, the energy storage apparatus 1 where the plurality of energy storage devices 2 are electrically connected to each other is completed (see FIG. 1). An air supply duct is connected to the energy storage apparatus 1 when the energy storage apparatus 1 is mounted on target equipment (automobile, for example). In connecting the air supply duct to the equipment, male threaded members which are made to pass through holes formed in the air supply duct are made to pass through second through holes 607 formed in the opposedly facing members 60, and are threadedly engaged with the energy storage apparatus 1 (second connection portions 307 of the first adjacent member 3). Accordingly, in the same manner as the male threaded members 110 threadedly engaged with the first connection portions 306, the male threaded members provided for connecting the air supply duct also has a function of connecting the first adjacent member 3 to the opposedly facing members 60.

As has been described heretofore, the energy storage apparatus 1 includes: the energy storage devices 2; the opposedly facing members 60 which opposedly face the energy storage devices 2 in the Y axis direction (first direction); and the first adjacent member which includes the first body portion (body portion) 30 disposed adjacently to the energy storage devices 2 in the X axis direction (second direction) orthogonal to the Y axis direction, and containing the first connection portions (connection portions) 306 partially connected to the opposedly facing members 60 at the end portions of the first body portion 30 in the Y axis direction. The first body portion 30 of the first adjacent member 3 contains the cavity portions 311, 312 which open at the end portions of the first body portion 30 in the directions orthogonal to the X axis direction (second direction), and extend in the directions orthogonal to the X axis direction (second direction).

According to the energy storage apparatus 1 having the above-mentioned configuration, the energy storage devices 2 are disposed adjacently to the first body portion 30 of the first adjacent member 3 connected to the opposedly facing member 60 and hence, the energy storage devices 2 are positioned with reference to the first adjacent member 3. The first body portion 30 of the first adjacent member 3 has the cavity portions 311, 312 which open at the end portions of the first body portion 30 in the directions orthogonal to the X axis direction and extend in the directions orthogonal to the X axis direction and hence, an occupation ratio of a space in the whole first adjacent member 3 is increased. Accordingly, the increase of a weight of the first adjacent member 3 can be suppressed. As a result, the increase of a weight of the whole energy storage apparatus 1 can be suppressed. Further, the first body portion 30 has the cavity portions 311, 312 and hence, a space (air layer) is formed in the first adjacent member 3 (first body portion 30) and hence, a heat insulation effect can be obtained between two energy storage devices 2 disposed adjacently to each other.

The first body portion 30 includes the plurality of cavity portions 311, 312, and the plurality of cavity portions 311, 312 are disposed parallel to each other and hence, the plurality of cavity portions 311, 312 increase an occupation ratio of a space in the inside of the first adjacent member 3. Further, by disposing the plurality of independent cavity portions 311, 312 parallel to each other, a solid portion (rib 313) exists between the first cavity portions 311 disposed adjacently to each other and hence, rigidity (rigidity capable of resisting against a force which sandwiches the energy storage devices 2) in the X axis direction of the first adjacent member 3 (first body portion 30) is ensured.

In this embodiment, the first body portion 30 includes, as the cavity portions 311, 312: the first cavity portions 311 which open at the end portions of the first body portion 30 in the Z axis direction (third direction) orthogonal to the Y axis direction (first direction) and the X axis direction (second direction), and extend in the Z axis direction (third direction); and the second cavity portions 312 which open at the end portions of the first body portion 30 in the Y axis direction (first direction) at positions displaced from the first connection portions (connection portions) 306 in the Z axis direction (third direction), and extend in the Y axis direction (first direction). Accordingly, in addition to the first cavity portions 311, the second cavity portions 312 extending in the Y axis direction (first direction) can be formed in the regions in each of which the first cavity portions 311 extending in the Z axis direction (third direction) cannot be formed due to the presence of the first connection portions (connection portions) 306. With such a configuration, an occupation ratio of a space in the first adjacent member 3 (first body portion 30) can be increased. Accordingly, the increase of a weight of the first adjacent member 3 (first body portion 30) can be suppressed. As a result, the increase of a weight of the whole energy storage apparatus 1 can be suppressed.

In this embodiment, the opposedly facing member 60 is disposed on both sides of the energy storage devices 2 in the Y axis direction, and the first body portion 30 includes: the first connection portion 306 at both end portions of the first body portion 30 in the Y axis direction; the second cavity portions 312 which open at one end portion of the first body portion 30 in the Y axis direction; and the second cavity portions 312 which open at the other end portion of the first body portion 30 in the Y axis direction. Accordingly, the first connection portions 306 formed on both end portions of the first adjacent member 3 in the Y axis direction are respectively connected to the corresponding opposedly facing members 60. With such a configuration, the first adjacent member 3 can be firmly fixed thus positioning the energy storage devices 2 with certainty.

The first body portion 30 of the first adjacent member 3 has: the second cavity portions 312 which open at one end portion of the first body portion 30 in the Y axis direction; and the second cavity portions 312 which open at the other end portion of the first body portion 30 in the Y axis direction. Accordingly, even when the first connection portion 306 is disposed on both end portions of the first adjacent member 3 in the Y axis direction, an occupation ratio of a space can be increased. That is, the second cavity portions 312 extending in the Y axis direction are formed on each of both end portions of the first body portion 30 in the Y axis direction where the first cavity portion 311 extending in the Z axis direction cannot be formed due to the presence of the first connection portion 306 and hence, an occupation ratio of a space in the whole first adjacent member 3 can be further increased.

In this embodiment, each first cavity portion 311 includes a through hole, each second cavity portion 312 includes a non-though hole, and the first cavity portions 311 and the second cavity portions 312 are in a non-communication state. Accordingly, solid rib-like portions are formed on both sides of each first cavity portion 311 in the Y axis direction and both sides of each second cavity portion 312 in the Z axis direction. Accordingly, the first adjacent member 3 can acquire a sufficient strength (compression strength) in the Y axis direction with certainty.

In this embodiment, the energy storage apparatus 1 includes the flow channels (passage) through which cooling air (fluid) is made to flow between the first body portion 30 and the energy storage device 2 disposed adjacently to the first body portion 30, and each second cavity portion 312 includes a non-through hole which extends in a direction which corresponds to a flow direction of the cooling air (fluid) in the flow channels (passages). Accordingly, it is possible to prevent the cooling air which is provided for cooling the energy storage devices 2 from passing through the inside of the first body portion 30 of the first adjacent member 3. With such a configuration, cooling air can be supplied to the flow channels formed along the energy storage devices 2 without loss.

The method for manufacturing the energy storage apparatus 1 having the above-mentioned configuration includes the steps of providing the first adjacent member 3 which includes the first body portion 30 containing the first connection portion 306 at least at either one of both end portions of the first body portion 30 in the Y axis direction and having a thickness in the X axis direction orthogonal to the Y axis direction, wherein the first body portion 30 contains the cavity portions 311, 312 which open at least at either one of both end portions of the first body portion 30 in the directions orthogonal to the X axis direction and extend in the directions orthogonal to the X axis direction; connecting the first connection portion 306 of the first adjacent member 3 to the opposedly facing member 60 extending in the X axis direction at a middle position in the X axis direction; disposing at least one energy storage device 2 in at least either one of two regions disposed in the X axis direction with the first body portion 30 of the first adjacent member 3 used as a boundary between the regions; and disposing the energy storage devices 2 along the first body portion 30 of the first adjacent member 3.

With such a method for manufacturing the energy storage apparatus 1, the first connection portions 306 of the first body portion 30 of the first adjacent member 3 are connected to the opposedly facing members 60 and hence, the first adjacent member 3 is fixed at the predetermined position with respect to the opposedly facing members 60. Further, the energy storage devices 2 are disposed along the first adjacent member 3 in a state where the energy storage devices 2 are disposed in at least either one of two regions with the first body portion 30 of the first adjacent member 3 used as a boundary between the regions so that the energy storage devices 2 are disposed with reference to the first adjacent member 3. Accordingly, the energy storage devices 2 are positioned by being disposed along the first body portion 30 of the first adjacent member 3 fixed to the opposedly facing member 60. The first body portion 30 of the first adjacent member 3 has the cavity portions 311, 312 which open at the end portions of the first body portion 30 in the directions orthogonal to the X axis direction and extend in the directions orthogonal to the X axis direction and hence, an occupation ratio of a space in the whole first adjacent member 3 is increased. Accordingly, the increase of a weight of the first adjacent member 3 can be suppressed. As a result, the increase of a weight of the whole energy storage apparatus 1 can be suppressed.

Particularly, the method further includes the step of maintaining the posture of the first adjacent member 3 in at least either one of the posture where the first adjacent member 3 is connected to the opposedly facing members 60 or the posture where the energy storage devices 2 are disposed along the first body portion 30 by inserting the jig 100 into the cavity portions (first cavity portions) 311 of the first adjacent member 3 and maintaining the jig 100 at a predetermined position. With such a method, the jig 100 or the like does not exist around the first body portion 30 in the Y axis direction and the Z axis direction respectively and hence, it is possible to smoothly perform an operation of connecting the first adjacent member 3 and the opposedly facing members 60 to each other and an operation of disposing the energy storage devices 2 along the first body portion 30 of the first adjacent member 3.

The method for manufacturing the first adjacent member 3 for the energy storage apparatus 1 having the above-mentioned configuration further includes the step of forming the first adjacent member 3 by injecting a resin into a molding space formed by fastening a plurality of dies 150. The first adjacent member 3 contains the first body portion 30 including the first connection portion 306 which is connected to the opposedly facing member 60 disposed adjacently to the first adjacent member 3 in the Y axis direction at least at either one of both end portions the first body portion 30 in the Y axis direction, having a thickness in the X axis direction orthogonal to the Y axis direction, and disposed adjacently to the energy storage devices 2 in the X axis direction. The first body portion 30 contains the first cavity portions 311 which open at least at either one of both end portions of the first body portion 30 in the Z axis direction orthogonal to the Y axis direction and the X axis direction respectively, and extends in the Z axis direction, and the second cavity portions 312 which open at least at either one of both end portions of the first body portion 30 in the Y axis direction at positions displaced from the first connection portions 306 in the Z axis direction, and extend in the Y axis direction.

With such a method, it is possible to form, by resin molding, the first adjacent member 3 having the first body portion 30 which has the first connection portions 306 connected to the opposedly facing members 60 at the end portions of the first body portion 30 in the Y axis direction and to which the energy storage devices 2 are disposed adjacently in the X axis direction. Further, the first body portion 30 of the first adjacent member 3 has: the first cavity portions 311 which open at least at either one of both end portions of the first body portion 30 in the Z axis direction orthogonal to the Y axis direction and the X axis direction respectively, and extend in the Z axis direction; and the second cavity portions 312 which open at least at either one of both end portions of the first body portion 30 in the Y axis direction at positions displaced from the first connection portions 306 in the Z axis direction, and extend in the Y axis direction. Accordingly, an occupation ratio of a space in the whole first adjacent member 3 is increased. With such a configuration, the increase of a weight of the first adjacent member 3 is suppressed. As a result, it is possible to suppress the increase of a weight of the whole energy storage apparatus 1. The first body portion 30 has the first cavity portions 311 and the second cavity portions 312 and hence, in the first body portion 30, an amount of thick wall portion is decreased so that, as a result, shrinkage of a thickness after molding can be suppressed. Accordingly, molding accuracy of the first adjacent member 3 can be increased.

The present invention is not limited to the above-mentioned embodiment, and it is needless to say that various modifications are conceivable without departing from the gist of the present invention.

Figure 17:
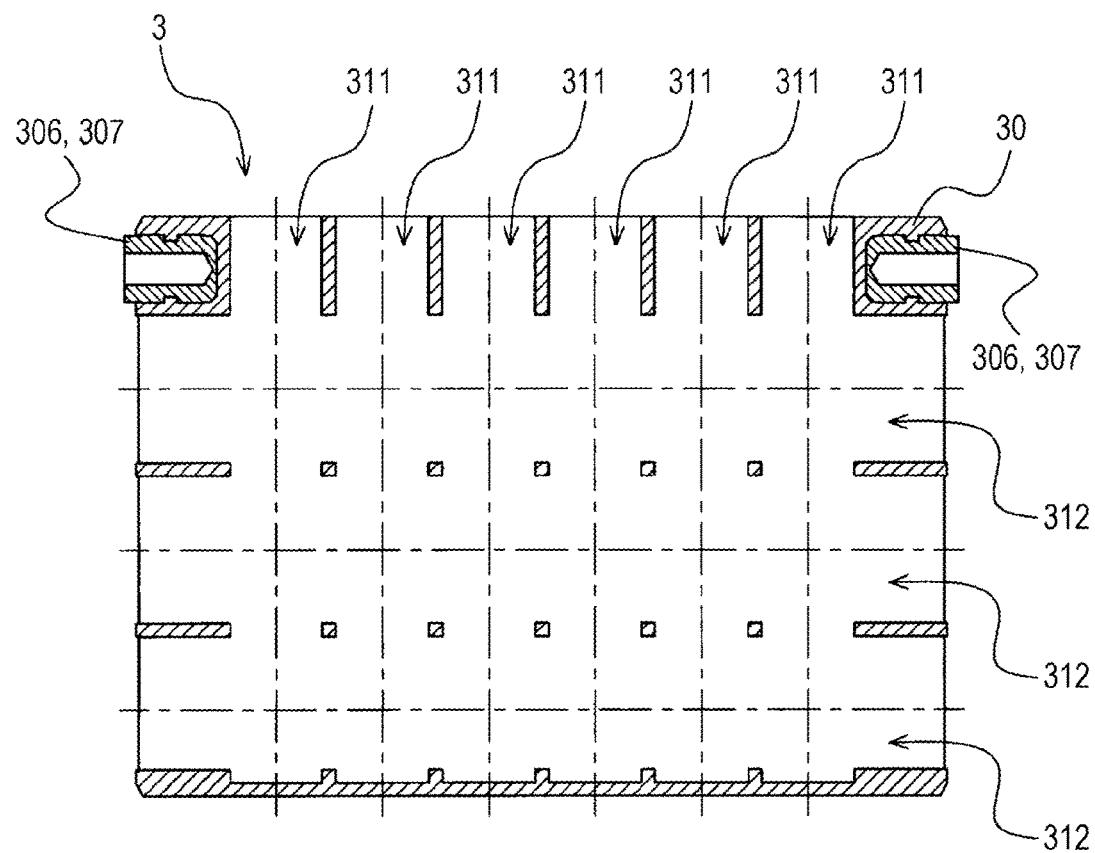
FIG. 17 is a cross-sectional view of a first adjacent member used in an energy storage apparatus according to another embodiment.
Figure 17:
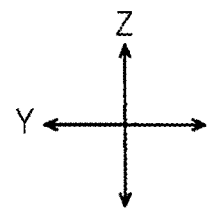
Figure 18:
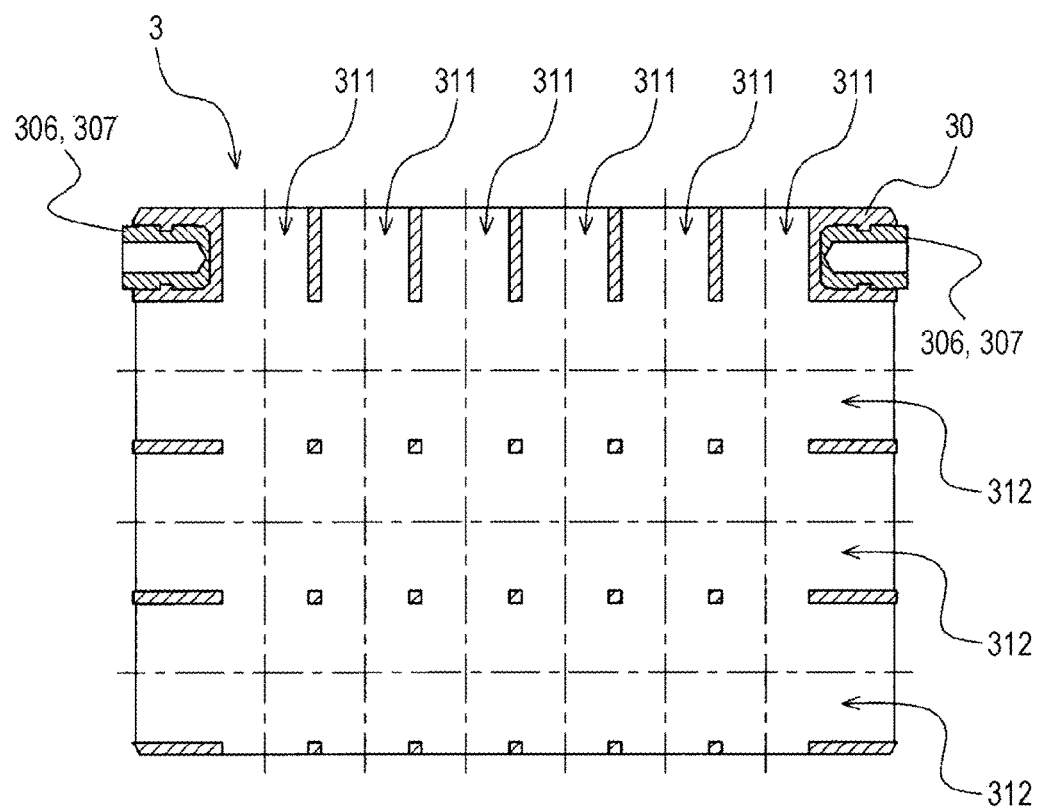
FIG. 18 is a cross-sectional view of a first adjacent member used in an energy storage apparatus according to still another embodiment.
Figure 19:
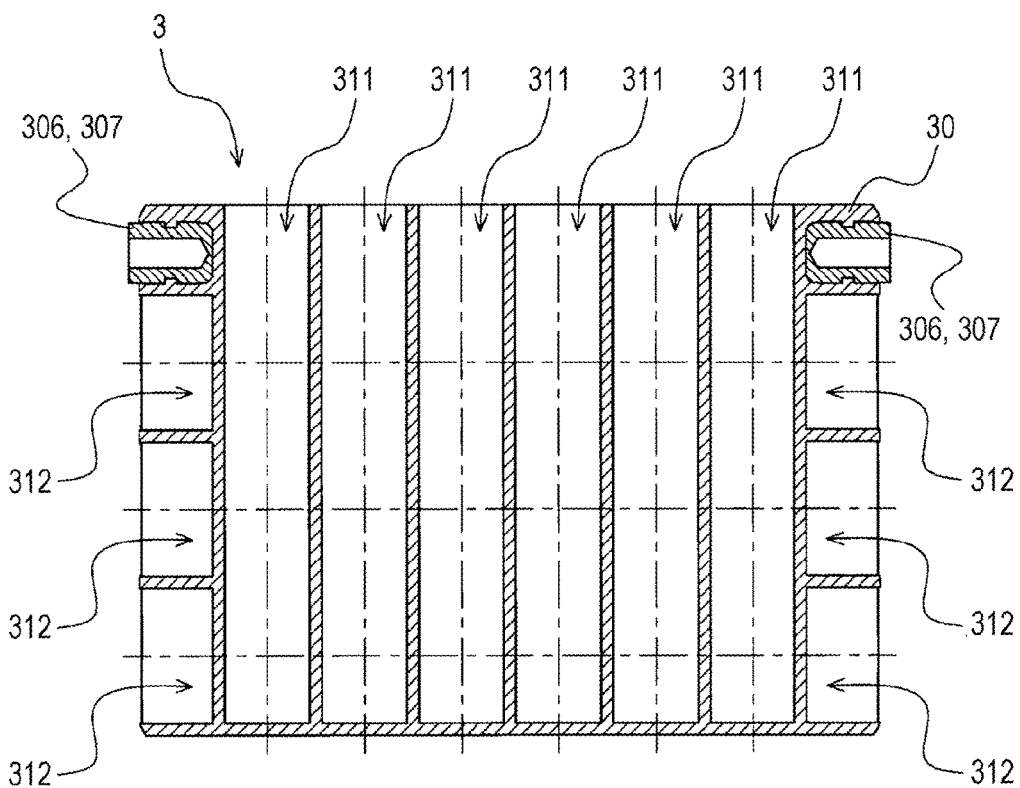
FIG. 19 is a cross-sectional view of a first adjacent member used in an energy storage apparatus according to still another embodiment.

In the above-mentioned embodiment, the first cavity portions 311 formed on the first body portion 30 of the first adjacent member 3 are respectively formed of a through hole, and the second cavity portions 312 formed on the first body portion 30 of the first adjacent member 3 are respectively formed of a non-through hole. However, the present invention is not limited to such a configuration. For example, as shown in FIG. 17, the first cavity portions 311 may be respectively formed of a non-through hole, and the second cavity portions 312 may be respectively formed of a through hole. Further, as shown in FIG. 18, the first cavity portions 311 may be respectively formed of a through hole and the second cavity portions 312 may also be respectively formed of a through hole. Alternatively, as shown in FIG. 19, the first cavity portions 311 may be respectively formed of a non-through hole and the second cavity portions 312 may also be respectively formed of a non-through hole.

In the above-mentioned embodiment, the first cavity portions 311 and the second cavity portions 312 formed on the first body portion 30 of the first adjacent member 3 are formed such that first and second cavity portions 311, 312 do not communicate with each other. However, the present invention is not limited to such a configuration. For example, as shown in FIG. 17 and FIG. 18, the first cavity portions 311 and the second cavity portions 312 may be made such that first and second cavity portions 311, 312 communicate with each other.

In the above-mentioned embodiment, as the connection portions connected to the oppposedly facing members 60, the first adjacent member 3 has: the first connection portions 306 provided only for being connected to the oppposedly facing members 60; and the second connection portions 307 provided for being connected to the oppposedly facing members 60 along with the connection of the air supply duct to the first adjacent member 3. However, the present invention is not limited to such a configuration. For example, the first adjacent member 3 may have only the first connection portions 306 provided only for being connected to the oppposedly facing members 60. Alternatively, the first adjacent member 3 may have only the second connection portions 307 provided for being connected to the oppposedly facing members 60 along with the connection of the air supply duct to the first adjacent member 3.

In the above-mentioned embodiment, the holder 6 includes the pair of oppposedly facing members 60 and, along with such a configuration, the connection portions (the first connection portions 306 and the second connection portions 307) are formed on both end portions of the first body portion 30 of the first adjacent member 3. However, for example, when the holder 6 includes a single oppposedly facing member 60, it is sufficient that the connection portions 306, 307 be formed on either one of the end portions (end portions which oppposedly face the oppposedly facing members 60) of the first body portion 30 of the first adjacent member 3.

Figure 20:
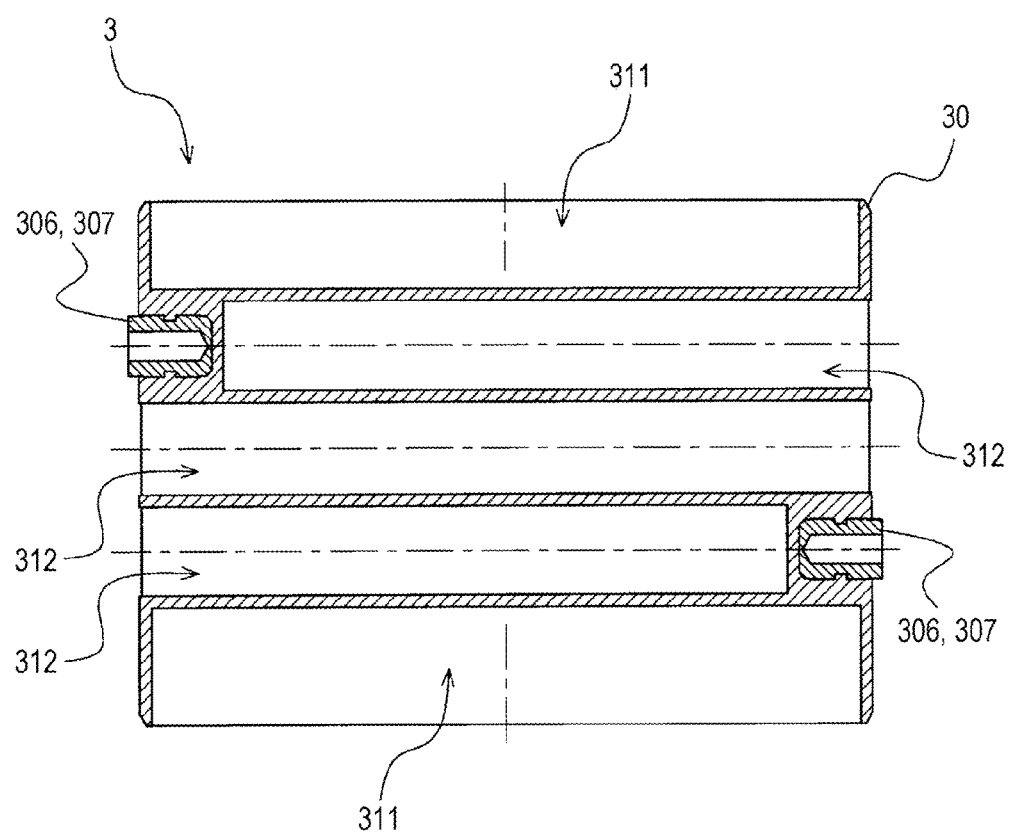
FIG. 20 is a cross-sectional view of a first adjacent member used in an energy storage apparatus according to still another embodiment.
Figure 20:
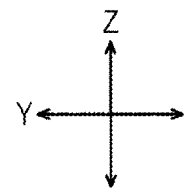

In the above-mentioned embodiment, the connection portions 306 (307) (first connection portions 306 (second connection portions 307)) which are formed on the first body portion 30 of the first adjacent member 3 are disposed in the form of a pair at symmetrical positions. However, the present invention is not limited to such a configuration. For example, as shown in FIG. 20, the connection portions 306 (307) which form a pair may be disposed at asymmetrical positions. That is, the connection portions 306 (307) which form a pair may be disposed at positions different from each other in the Z axis direction. In this case, the second cavity portion 312 formed of a non-through hole which opens on a side opposite to the connection portion 306 (307) in the Y axis direction may be formed at a position which corresponds to each connection portion 306 (307) and, at the same time, first cavity portions 311 which communicate with the second cavity portions 312 or do not communicate with the second cavity portion 312 may be formed on the first adjacent member 3. When the connection portion 306 (307) formed on one end portion of the first adjacent member 3 in the Y axis direction and the connection portion 306 (307) formed on the other end portion of the first adjacent member 3 in the Y axis direction are disposed in a spaced-apart manner in the Z axis direction, in addition to the above-mentioned second cavity portions 312 respectively formed of a non-through hole, the second cavity portion 312 which extends in a penetrating manner may be formed on the first adjacent member 3 between both connection portions 306 (307).

In the above-mentioned embodiment, the plurality of first cavity portions 311 and the plurality of second cavity portions 312 are formed on the first body portion 30. However, the present invention is not limited to such a configuration. For example, a single first cavity portion 311 may be formed on the first body portion 30 (see FIG. 20), or a single second cavity portion 312 may be formed on the first body portion 30. In the above-mentioned embodiment, the first body portion 30 has, as the cavity portions 311, 312: the first cavity portions 311 extending in the Z axis direction; and the second cavity portions 312 extending in the Y axis direction. However, the present invention is not limited to such a configuration. For example, it is sufficient that the first body portion 30 have either one of the first cavity portions 311 extending in the Z axis direction or the second cavity portions 312 extending in the Y axis direction. The first body portion 30 may have cavity portions which open at end portions of the first body portion 30 in a composite direction of the Z axis direction and the Y axis direction, and extend in the composite direction. That is, it is sufficient for the first body portion 30 to have at least one cavity portion which opens at the end portion of the first body portion 30 in the direction orthogonal to the X axis direction (second direction) and extends in the direction orthogonal to the X axis direction (second direction).

In the above-mentioned embodiment, the first adjacent member 3 includes the projecting portions 32 provided for forming the flow channels. However, the present invention is not limited to such a configuration. It is sufficient that the projecting portions 32 be formed according to necessity of the flow channels.

In the above-mentioned embodiment, the first adjacent member 3 includes the shaft portions 308. However, the present invention is not limited to such a configuration. It is sufficient for the first adjacent member 3 to have the shaft portions 308 when necessary.

In the above-mentioned embodiment, each of the connection portions 306, 307 is formed of a female threaded member made of metal and, along with such a configuration, the first adjacent member 3 is formed by insert molding. However, the present invention is not limited to such a configuration. For example, the connection portions 306, 307 may be formed by resin molding in the same manner as other members. However, each of the connection portions 306, 307 is connected to the oppositely facing member 60 and hence, it is needless to say that strength (rigidity) of the connection portions 306, 307 is required to be held with certainty. In the above-mentioned embodiment, the first cavity portions 311 and the second cavity portions 312 are formed by resin molding along with the formation of the first adjacent member 3 (first body portion 30) by molding. However, the present invention is not limited to such a configuration. For example, the first cavity portions 311 and the second cavity portions 312 may be formed such that a solid first adjacent member 3 (first body portion 30) is formed by molding and, thereafter, the first cavity portions 311 and the second cavity portions 312 are formed on the first body portion 30 by cutting.

In the above-mentioned embodiment, the energy storage devices 2 are disposed in each of two regions in the X axis direction using the first body portion 30 of the first adjacent member 3 as a boundary, and the first adjacent member 3 performs the positioning of the energy storage devices 2 disposed in two regions. However, the present invention is not limited to such a configuration. For example, the energy storage apparatus 1 may be configured such that the energy storage devices 2 are disposed in either one of two regions in the X axis direction using the first body portion 30 of the first adjacent member 3 as the boundary, and the first adjacent member 3 performs the positioning of the energy storage devices 2 disposed in one region. To be more specific, the energy storage apparatus 1 may be configured such that two first adjacent members 3 are disposed in a spaced-apart manner in the X axis direction, and one first adjacent member 3 performs the positioning of the energy storage devices 2 disposed in the region on one side in the X axis direction while the other first adjacent member 3 performs the positioning of the energy storage devices 2 disposed in the region on the other side in the X axis direction. It is needless to say that, also in this case, each first adjacent member 3 is fixed to (connected to) the oppositely facing members 60.

In the above-mentioned embodiment, the body portion 30, 40, 50 of the adjacent member 3, 4, 5 is formed into a quadrangular shape corresponding to the outer surface of the case 20 of the energy storage device 2 which is directed in the X axis direction. However, the present invention is not limited to such a configuration. Provided that a creepage distance between the energy storage devices 2 disposed adjacently to each other can be held with certainty, an outer surface of the body portion 30, 40, 50 of the adjacent member 3, 4, 5 which is directed in the X axis direction may be changed into various shapes.

In the above-mentioned embodiment, the second body portion 40 of each second adjacent member 4 is formed into a rectangular corrugated shape in cross section. However, the present invention is not limited to such a configuration. For example, the second body portion 40 may be formed into a flat plate shape. In such a case, when the flow channels are formed as in the case of the above-mentioned embodiment, it is sufficient for the second adjacent member 4 to have projecting portions (projecting ridges) which project from the second body portion 40 having a flat plate shape.

In the above-mentioned embodiment, the adjacent member 3, 4, 5 includes the restricting portions 31, 41, 51. However, the present invention is not limited to such a configuration. It is sufficient to provide the restricting portions 31, 41, 51 to the adjacent member 3, 4, 5 according to necessity. Further, in the above-mentioned embodiment, the restricting members 310, 410, 510 of each pair of restricting portions 31, 41, 51 are formed along four corners (four corner portions) of the body portion 30, 40, 50. However, the present invention is not limited to such a configuration. The restricting portions 31, 41, 51 may be disposed at positions where the restricting portions 31, 41, 51 can constrain the cases 20 of the energy storage devices 2.

What is claimed is:

1. An energy storage apparatus comprising:
    an energy storage device;
    an oppositely facing member which oppositely faces the energy storage device in a first direction; and
    an adjacent member which includes a body portion disposed adjacently to the energy storage device in a second direction orthogonal to the first direction, and containing a connection portion connected to the oppositely facing member at an end portion of the body portion in the first direction, wherein
    the body portion of the adjacent member contains a cavity portion which opens at an end portion of the body portion in a direction orthogonal to the second direction and extends in the direction orthogonal to the second direction.

2. The energy storage apparatus according to claim 1, wherein the body portion contains the cavity portion which includes a plurality of cavity portions, and the plurality of cavity portions are disposed parallel to each other.

3. The energy storage apparatus according to claim 1, wherein the energy storage apparatus includes a passage through which a fluid is made to flow between the body portion and the energy storage device disposed adjacently to the body portion, and
    the cavity portion includes a non-through hole which extends in a direction which corresponds to a flow direction of the fluid in the passage.

4. The energy storage apparatus according to claim 1, wherein
    the cavity portion includes
    a first cavity portion which opens at an end portion of the body portion in a third direction orthogonal to the first direction and the second direction, and extends in the third direction, and
    a second cavity portion which opens at an end portion of the body portion in the first direction at a position displaced from the connection portion in the third direction, and extends in the first direction.

5. The energy storage apparatus according to claim 4, wherein
    the oppositely facing member is disposed on both sides of the energy storage device in the first direction, and
    the body portion includes
    the connection portion at both end portions of the body portion in the first direction,
    the second cavity portion which opens at one end portion of the body portion in the first direction, and
    the second cavity portion which opens at the other end portion of the body portion in the first direction.

6. The energy storage apparatus according to claim 4, wherein
    the first cavity portion includes a through hole,
    the second cavity portion includes a non-though hole, and
    the first cavity portion and the second cavity portion are in a non-communication state.

7. A method for manufacturing an energy storage apparatus comprising:
- providing an adjacent member which includes a body portion containing a connection portion at least at either one of both end portions of the body portion in a first direction and having a thickness in a second direction orthogonal to the first direction, wherein the body portion contains a cavity portion which opens at an end portion of the body portion in a direction orthogonal to the second direction and extends in a direction orthogonal to the second direction;
- connecting the connection portion of the adjacent member to an opposedly facing member extending in the second direction at a middle position in the second direction;
- disposing at least one energy storage device in at least either one of two regions disposed in the second direction with the body portion of the adjacent member used as a boundary between the regions; and
- disposing the energy storage device along the body portion of the adjacent member.

8. The method for manufacturing an energy storage apparatus according to claim 7, further comprising maintaining the posture of the adjacent member in at least either one of the posture where the adjacent member is connected to the opposedly facing member or the posture where the energy storage device is disposed along the body portion by inserting a jig into the cavity portion of the adjacent member and maintaining the jig at a predetermined position.

9. A method for manufacturing an adjacent member for an energy storage apparatus comprising forming an adjacent member by injecting a resin into a molding space formed by fastening a plurality of dies, wherein
- the adjacent member comprises a body portion containing a connection portion which is connected to an opposedly facing member disposed adjacently to the adjacent member in a first direction at least at either one of both end portions of the body portion in the first direction, having a thickness in a second direction orthogonal to the first direction, and disposed adjacently to the energy storage device in the second direction, and
- the body portion contains a first cavity portion which opens at least at either one of both end portions of the body portion in a third direction orthogonal to the first direction and the second direction respectively, and extends in the third direction, and a second cavity portion which opens at least at either one of both end portions of the body portion in the first direction at a position displaced from the connection portion in the third direction, and extends in the first direction.

* * * * *